(12) United States Patent
Denby

(10) Patent No.: US 12,354,373 B2
(45) Date of Patent: Jul. 8, 2025

(54) METHOD AND SYSTEM FOR PROVIDING A RIDER WITH A DYNAMIC ENVIRONMENTAL AWARENESS

(71) Applicant: Roadio, Inc., San Francisco, CA (US)

(72) Inventor: Jonathan Denby, San Francisco, CA (US)

(73) Assignee: Roadio, Inc., San Francisco, CA (US)

( * ) Notice: Subject to any disclaimer, the term of this patent is extended or adjusted under 35 U.S.C. 154(b) by 0 days.

(21) Appl. No.: 18/616,688

(22) Filed: Mar. 26, 2024

(65) Prior Publication Data

US 2024/0331401 A1     Oct. 3, 2024

Related U.S. Application Data

(60) Provisional application No. 63/493,902, filed on Apr. 3, 2023.

(51) Int. Cl.
| | |
|---|---|
| *G06V 20/58* | (2022.01) |
| *B60R 1/26* | (2022.01) |
| *B62J 50/22* | (2020.01) |
| *G06T 3/40* | (2006.01) |
| *G06T 7/20* | (2017.01) |
| *G06T 7/70* | (2017.01) |

(Continued)

(52) U.S. Cl.
CPC ............... *G06V 20/58* (2022.01); *B60R 1/26* (2022.01); *B62J 50/22* (2020.02); *G06T 3/40* (2013.01); *G06T 7/20* (2013.01); *G06T 7/70* (2017.01); *G06V 10/22* (2022.01); *G06V 10/24* (2022.01); *G06V 10/267* (2022.01); *H04N 23/90* (2023.01); *B60R 2300/105* (2013.01); *B60R 2300/802* (2013.01); *G06T 2207/20081* (2013.01); *G06T 2207/30252* (2013.01)

(58) Field of Classification Search
CPC ...... G06V 20/58; G06V 10/24; G06V 10/267; G06V 10/22; G06T 7/70; G06T 3/40; G06T 7/20; G06T 2207/20081; G06T 2207/30252; B62J 50/22; B60R 1/26; B60R 2300/105; B60R 2300/802; H04N 23/90

See application file for complete search history.

(56) References Cited

U.S. PATENT DOCUMENTS

| | | |
|---|---|---|
| 4,798,318 A | 1/1989 | Irwin |
| 4,921,151 A | 5/1990 | Duvall |

(Continued)

FOREIGN PATENT DOCUMENTS

| | | |
|---|---|---|
| EP | 3807128 B1 | 1/2024 |
| WO | 2021240497 A1 | 12/2021 |

OTHER PUBLICATIONS

Denby, Jonathan, et al., "Method and System for Producing an Environmental Awareness for Alerting an Operator of a Vehicle", U.S. Appl. No. 18/617,216, filed Mar. 26, 2024.

(Continued)

*Primary Examiner* — Mohamed A. Wasel
(74) *Attorney, Agent, or Firm* — Jeffrey Schox; Diana Lin

(57) ABSTRACT

A method for providing a rider with a dynamic environmental awareness includes: receiving data from a set of sensors; correcting data; identifying a set of regions in the data; and processing the set of regions to detect a set of objects. In variants, the method can additionally include stabilizing the objects detected from the set of regions.

18 Claims, 17 Drawing Sheets
(2 of 17 Drawing Sheet(s) Filed in Color)

(51) Int. Cl.
*G06V 10/22* (2022.01)
*G06V 10/24* (2022.01)
*G06V 10/26* (2022.01)
*H04N 23/90* (2023.01)

(56) References Cited

U.S. PATENT DOCUMENTS

| | | | |
|---|---|---|---|
| 5,634,653 A | 6/1997 | Browning | |
| 7,787,857 B2 | 8/2010 | Peterman | |
| 8,481,190 B2 | 7/2013 | Kalis et al. | |
| 8,774,072 B2 | 7/2014 | Morris et al. | |
| 9,195,894 B2 | 11/2015 | Vasquez et al. | |
| 9,282,520 B2 | 3/2016 | Morris et al. | |
| 9,532,474 B2 | 12/2016 | Gutschenritter et al. | |
| 9,676,441 B2 | 6/2017 | Chen et al. | |
| 9,868,394 B1 * | 1/2018 | Fields | G08G 1/07 |
| 10,106,083 B1 * | 10/2018 | Fields | B60Q 9/008 |
| 10,182,222 B2 | 1/2019 | Hesla et al. | |
| 10,343,605 B1 * | 7/2019 | Fields | B60T 17/22 |
| 10,360,910 B2 | 7/2019 | Valentine et al. | |
| 10,393,872 B2 | 8/2019 | Brisimitzakis et al. | |
| 10,469,751 B2 | 11/2019 | Wissenbach et al. | |
| 10,527,722 B2 | 1/2020 | Carlson et al. | |
| 10,786,028 B2 | 9/2020 | Cech et al. | |
| 11,105,920 B2 | 8/2021 | Brisimitzakis et al. | |
| 11,254,386 B2 | 2/2022 | Isenschmid et al. | |
| 11,702,068 B2 * | 7/2023 | Jin | B60W 30/09 701/301 |
| 11,710,421 B2 | 7/2023 | Spence et al. | |
| 11,710,422 B2 | 7/2023 | Spence et al. | |
| 2014/0233795 A1 * | 8/2014 | Omino | G06V 20/58 382/103 |
| 2015/0035685 A1 * | 2/2015 | Strickland | B60Q 9/008 340/901 |
| 2016/0086040 A1 * | 3/2016 | Kuehnle | G06V 20/64 382/103 |
| 2017/0309174 A1 * | 10/2017 | Gonzales | G08B 21/02 |
| 2018/0338117 A1 * | 11/2018 | Park | G06V 10/147 |
| 2020/0223434 A1 | 7/2020 | Campos Macias et al. | |
| 2020/0238991 A1 | 7/2020 | Aragon et al. | |
| 2021/0139103 A1 | 5/2021 | Gillett | |
| 2021/0171026 A1 | 6/2021 | Pfau | |
| 2021/0300360 A1 | 9/2021 | Sasin et al. | |
| 2022/0118906 A1 * | 4/2022 | Wang | B60W 60/00276 |
| 2022/0222475 A1 | 7/2022 | Oesterling et al. | |
| 2023/0410525 A1 * | 12/2023 | Mohammed | B60R 25/302 |

OTHER PUBLICATIONS

Denby, Jonathan, et al., "Method and System for Providing a Rider with a Dynamic Environmental Awareness", U.S. Appl. No. 18/616,688, filed Mar. 26, 2024.

* cited by examiner

S500 (triggering actions at user interface)

passive "scanning" mode

1 Side / Front Collision Warning

2 Rear Approach Warning

3 Incident Recording

Image regions

S300

Image as operator turns right

METHOD AND SYSTEM FOR PROVIDING A RIDER WITH A DYNAMIC ENVIRONMENTAL AWARENESS

CROSS-REFERENCE TO RELATED APPLICATIONS

This application claims the benefit of U.S. Provisional Application No. 63/493,902, filed 3 Apr. 2023, which is incorporated in its entirety by this reference.

TECHNICAL FIELD

This invention relates generally to the image processing and vehicular alert fields, and more specifically to a new and useful system and method for providing a rider with a dynamic environmental awareness in the image processing and vehicular alert fields.

BRIEF DESCRIPTION OF THE FIGURES

The patent or application file contains at least one drawing executed in color. Copies of this patent or patent application publication with color drawing(s) will be provided by the Office upon request and payment of the necessary fee.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1A:
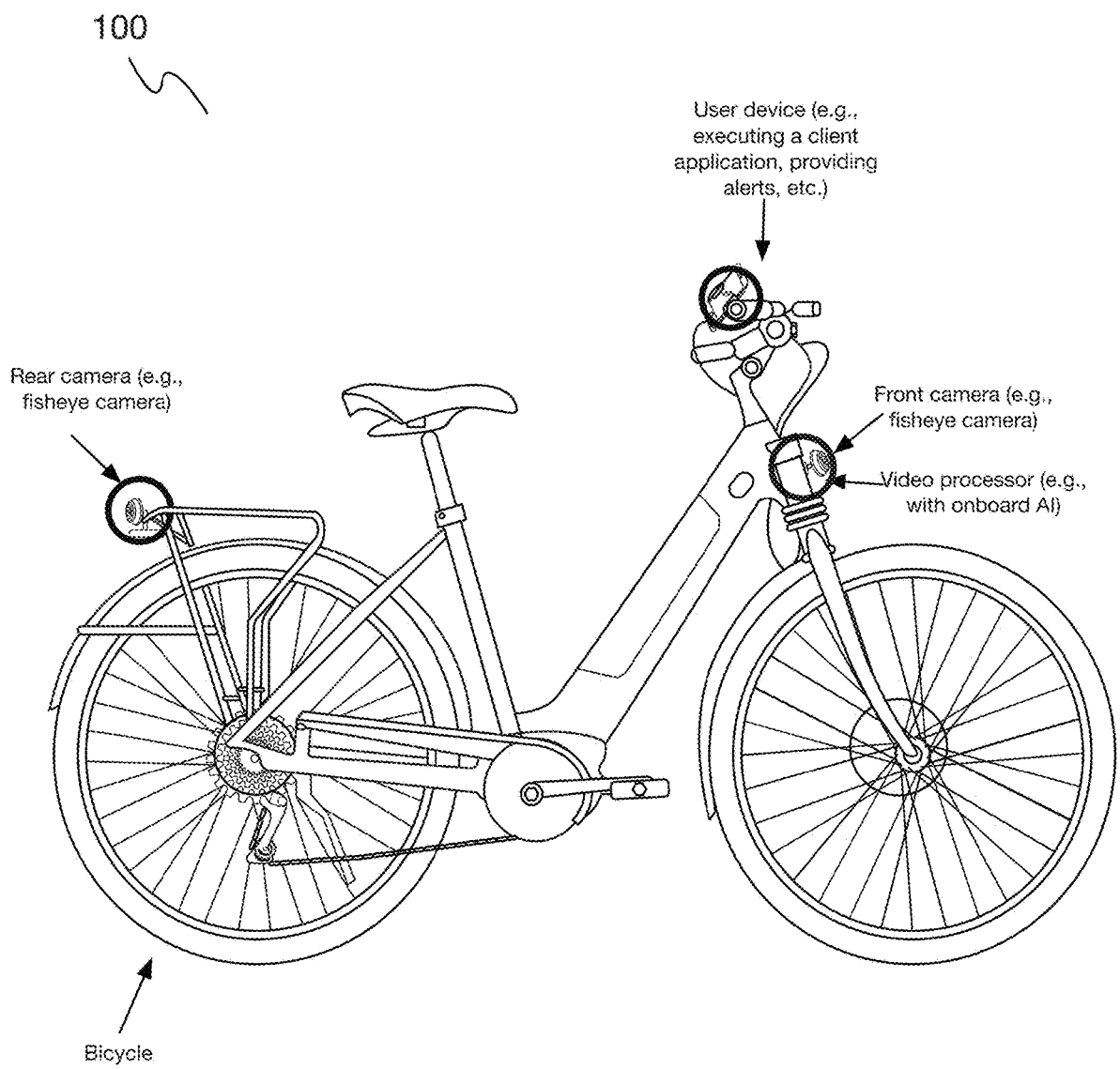
FIGS. 1A-1B are a schematic of a system for providing a rider with a dynamic environmental awareness.
Figure 1B:
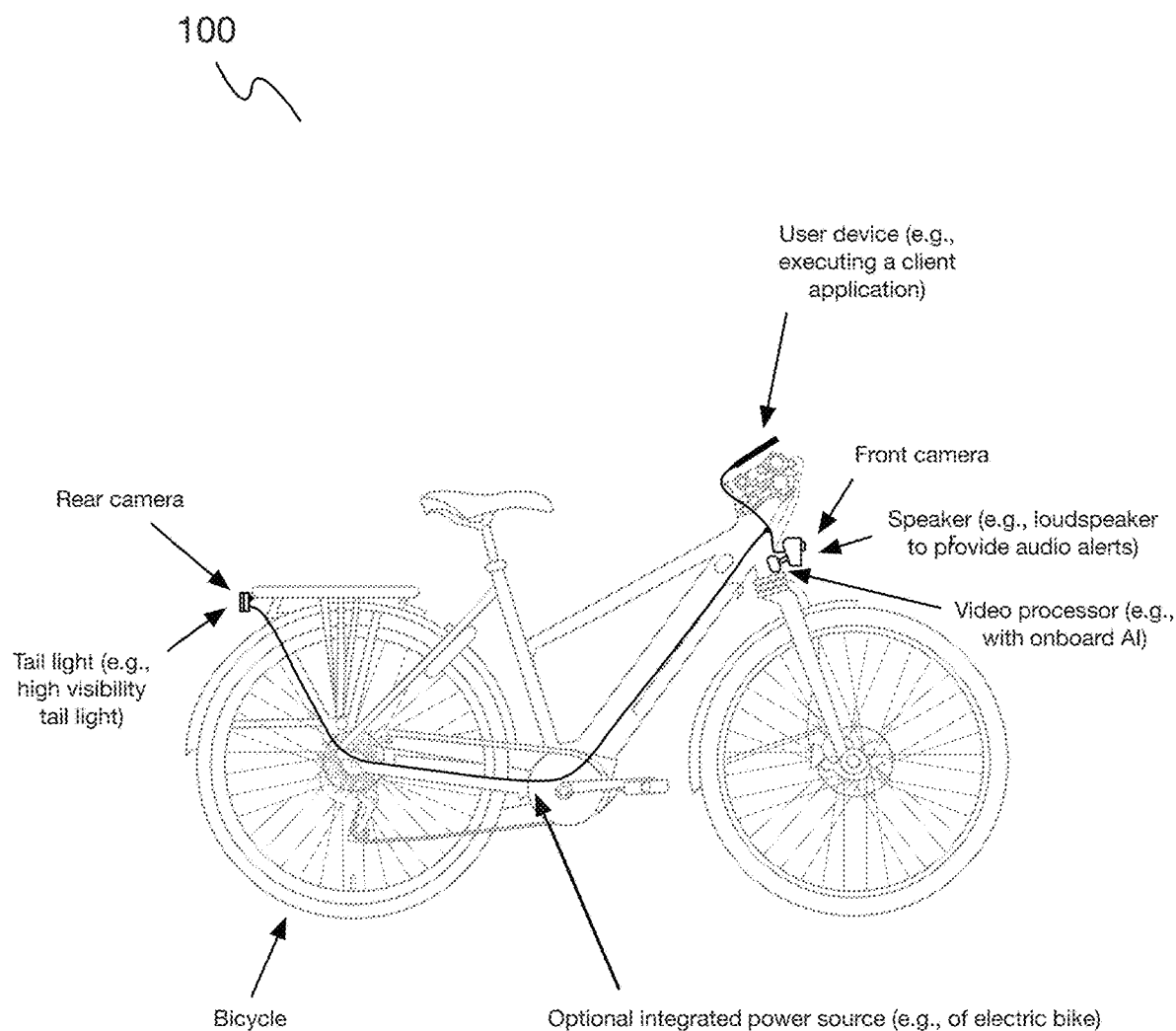

As shown in FIG. 1, a system 100 for providing a rider with a dynamic environmental awareness includes a sensor subsystem. Additionally or alternatively, the system 100 can include and/or interface with any or all of: a vehicle (e.g., bicycle); computing and/or processing subsystem; user interface; user device; output devices; and/or any other components.

Figure 2:
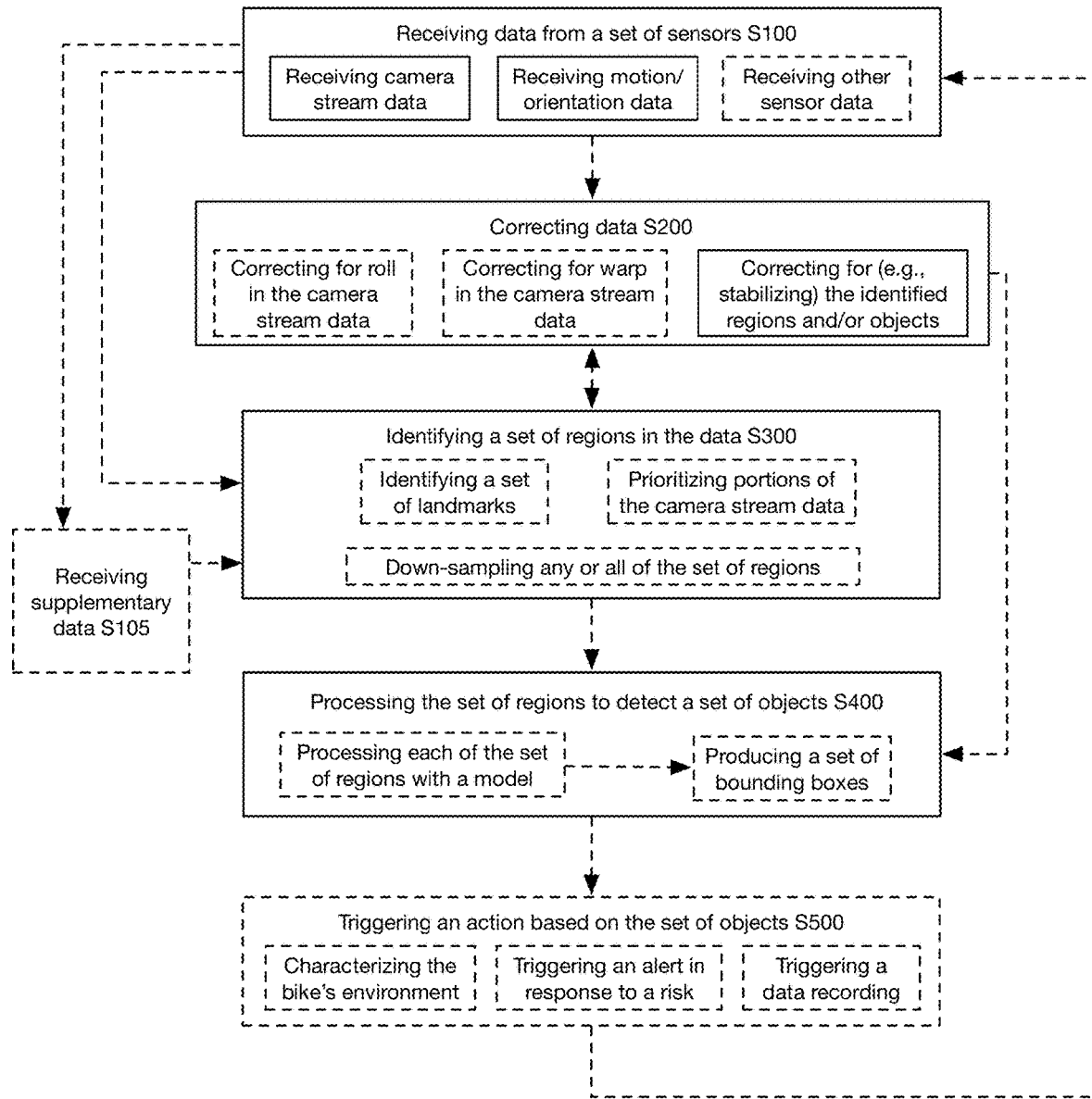
FIG. 2 is a schematic of a method for providing a rider with a dynamic environmental awareness.

As shown in FIG. 2, a method 200 for providing a rider with a dynamic environmental awareness includes: receiving data from a set of sensors S100; correcting data S200; identifying a set of regions in the data S300; and processing the set of regions to detect a set of objects S400. Additionally or alternatively, the method 200 can include triggering an action based on the set of objects S500 and/or any other suitable processes performed in any suitable order. The method 200 can be performed with a system 100 as described above and/or any other suitable system.

2. Technological Improvements

The system and method for providing a rider with a dynamic environmental awareness can confer several benefits over current systems and methods.

In a first variant, the technology confers the benefit of increasing the safety of vehicle operators (e.g., cyclists, bike riders, moped riders, motorcycle riders, etc.) along with other individuals (e.g., other bike riders, vehicle passengers, drivers, pedestrians, etc.) in their environment through the detection, monitoring, and intelligent provision of alerts regarding the behavior of surrounding objects. In specific examples, this is enabled through the use of a set of monocular cameras, motion/orientation sensors to stabilize feeds of the monocular cameras, and a set of models which detect and characterize the objects, thereby enabling the selective provision of alerts to the operator (equivalently referred to herein as a rider and/or driver). For instance, riding a bicycle or other personal vehicle can pose significant dangers to the rider as he navigates his environment, especially in densely populated areas in which automobiles, other cyclists, and pedestrians, operate in close proximity with the rider and often behave in unexpected and/or sudden ways. Providing a real-time, situational awareness to the rider such as described in the system and/or method below can have life-saving outcomes in such environments.

In a second variant, non-exclusive with the first, the technology can confer the benefit of enabling a low-cost solution for increasing operator (e.g., cyclist) safety through the use of low-cost components coupled with intelligent, use-case-specific processing of the data collected with the low-cost components. In specific examples, for instance, the technology is enabled without directly collecting depth information, such as by using monocular fisheye cameras, motion/orientation sensors, and processing onboard a user device and/or coupled to the vehicle, with specialized processing specific to the biking use case (e.g., taking into account biking motions). For instance, the inventors have discovered that in implementing the system with a bike or other 2-wheeled vehicle, there is a need to remove a wide range of bike motion from the video data in order to detect and characterize surrounding objects (e.g., predict the 3D trajectories of objects around the bike)—however, conventional image stabilization techniques are computationally expensive and take up too much compute power, which are prohibitive on low-cost embedded devices, and/or require specialized sensors (e.g., Lidar, Radar, etc.).

In a third variant, non-exclusive with those described above, the technology can confer the benefit of reducing and/or minimizing a computational expense associated with any or all of the processing performed in the method. In specific examples, for instance, in performing the image stabilization, the outputs of a neural network (e.g., bounding boxes) are stabilized (e.g., using accelerometer and/or gyroscope data) before feeding those outputs into a tracking algorithm but after detecting objects in the image (e.g., producing a set of bounding boxes). This is much less computationally expensive than, for instance, stabilizing an entire video stream before running an artificial intelligence (AI) model. In additional or alternative specific examples, regions within image data (e.g., from a video stream associated with fisheye cameras onboard a bike) are prioritized and sized based on this prioritization, such that regions which require high resolution are sized smaller than those which do not require high resolution (e.g., those which are closer to the camera, those in which objects are bigger, etc.) (e.g., and retain a higher resolution after a subsequent downsampling process of at least the low priority regions).

In a fourth variant, non-exclusive with those described above, the technology can confer the benefit of being retrofittable to numerous types of vehicles experiencing different types of motion and thereby requiring different types of image stabilization. In specific examples, various types of correction/stabilization (e.g., roll correction, accelerometer and gyroscope stabilization, etc.) are applied during the method (e.g., at various times to optimize for computational resources), which can make the system and method suitable for bikes (e.g., electric bikes, manual bikes, etc.), mopeds, scooters, motorcycles, and/or any other vehicles. Additionally or alternatively, the system can be retrofittable to numerous power types (e.g., powered vehicles, non-powered vehicles, etc.), vehicles shapes/sizes, and/or any other systems.

Additionally or alternatively, the system and method can confer any other benefit(s).

3. System

As shown in FIG. 1, a system 100 for providing an operator with a dynamic environmental awareness includes a sensor subsystem. Additionally or alternatively, the system 100 can include and/or interface with any or all of: a vehicle (e.g., bicycle); computing and/or processing subsystem; user interface; user device; output devices; and/or any other components.

The system 100 functions to collect and optionally process information (e.g., sensor data) in an environment of a biker, which can be used to increase the safety of the biker (and/or any other individuals in her environment) as she navigates her environment. Additionally or alternatively, the system 100 can function to provide actionable alerts to the rider (and/or any other users); minimize a cost (e.g., financial cost, computational cost, etc.) associated with the system and/or method; and/or can perform any other functions.

At least a portion of the system (e.g., sensor subsystem) is preferably configured to be mounted to and/or integrated within the vehicle. Additionally or alternatively, any or all of the system can be offboard the vehicle, reversibly coupled to the vehicle, part of supplementary devices (e.g., display of user device, compute onboard user device, etc.), and/or arranged at any combination of locations and/or devices.

3.1 System-Components

The system 100 is preferably configured to include and/or interface with at least a bicycle (equivalently referred to herein as a bike) and/or any other vehicle (e.g., moped, motorcycle, scooter, etc.), such that the system can collect and process data associated with the bicycle's traversal through its environment. The vehicle can be motorized (e.g., electric bike, moped, motorcycle, scooter, etc.), non-motorized (e.g., manual bike, scooter, etc.), or otherwise operable.

The vehicle is preferably a 2-wheeled vehicle or modified 2-wheel vehicle (e.g., bicycle with training wheels, 3-wheeled bicycle, etc.). Additionally or alternatively, the system 100 can be configured to interface with any other vehicle, such as a vehicle having greater than 2 wheels (e.g., car, 3-wheeled scooter, skateboard, etc.); a vehicle having less than 2 wheels (e.g., unicycle); other forms of transportation (e.g., rollerblades, stroller, watercraft, etc.); and/or any other vehicles or objects.

Further additionally or alternatively, the system 100 can be implemented in absence of a vehicle (e.g., coupled to a user as a pedestrian) and/or otherwise suitably implemented.

For the purposes of simplification, the vehicle that the system interfaces with can be referred to herein as a bicycle or bike.

The system includes a sensor subsystem (equivalently referred to herein as a set of sensors), which functions to collect information associated with the environment of the bike along with the bike itself (e.g., bike motion, bike orientation, etc.), where this information is preferably processed in the method 200 (e.g., to determine a set of alerts, to trigger an action, etc.). Additionally or alternatively, the sensor data can be used in any other suitable ways.

The sensor subsystem preferably includes an optical subsystem, which functions to collect image data (e.g., video streams) associated with the bike's environment. The optical subsystem preferably includes a set of cameras, but can additionally or alternatively include any other optical sensors (e.g., Lidar).

In preferred variations (e.g., as shown in FIG. 1), the optical subsystem includes a set of multiple cameras, which includes at least a front camera (e.g., which images the direction in which the bike is heading) and a rear camera (e.g., which images the direction trailing the bike). Additionally or alternatively, the cameras can image one or more sides of the bike, a region superior to the bike (e.g., upward-facing direction), a region inferior to the bike (e.g., downward-facing direction), and/or any other directions. Alternatively, the set of cameras can include a single camera and/or any other types of imaging devices.

In preferred specific examples, the system is implemented absent of Lidar and Radar sensors.

In alternative specific examples, the system can include and/or interface with Lidar and/or Radar sensors.

The set of cameras preferably includes one or more single lens cameras (e.g., monocular cameras), which function to capture image data in the vehicle's environment. In examples, a conventional limitation associated with single lens cameras can be a lack of depth information that can be determined (e.g., directly determined) from a single lens camera. However, in some variants, the system and/or method can confer the benefit of properly identifying and/or reacting to object depths without cameras having additional lenses, while conferring the benefits of single lens cameras, which can include, but are not limited to: lower cost, lower associated computational requirements associated with the collected data, smaller weight and/or physical profile, and/or any other benefits.

Additionally or alternatively, the set of cameras can include cameras having multiple lenses (e.g., stereocameras), sensors configured to collect depth information (e.g., LIDAR, RADAR, etc.), and/or any other sensors or combination of sensors.

In a preferred set of variants, each of the set of cameras is a monocular, fisheye (e.g., circular fisheye, full-frame fisheye, etc.) camera, which is configured to image the bike's environment with a wide field of view (e.g., 200 degrees, between 100 and 300 degrees, between 150 and 250 degrees, etc.), thereby enabling a minimal number of cameras to be used while being able to detect and understand the behavior of all relevant objects in the bike's environment. Additionally or alternatively, the cameras can include any other cameras and/or combination of cameras.

Figure 3:
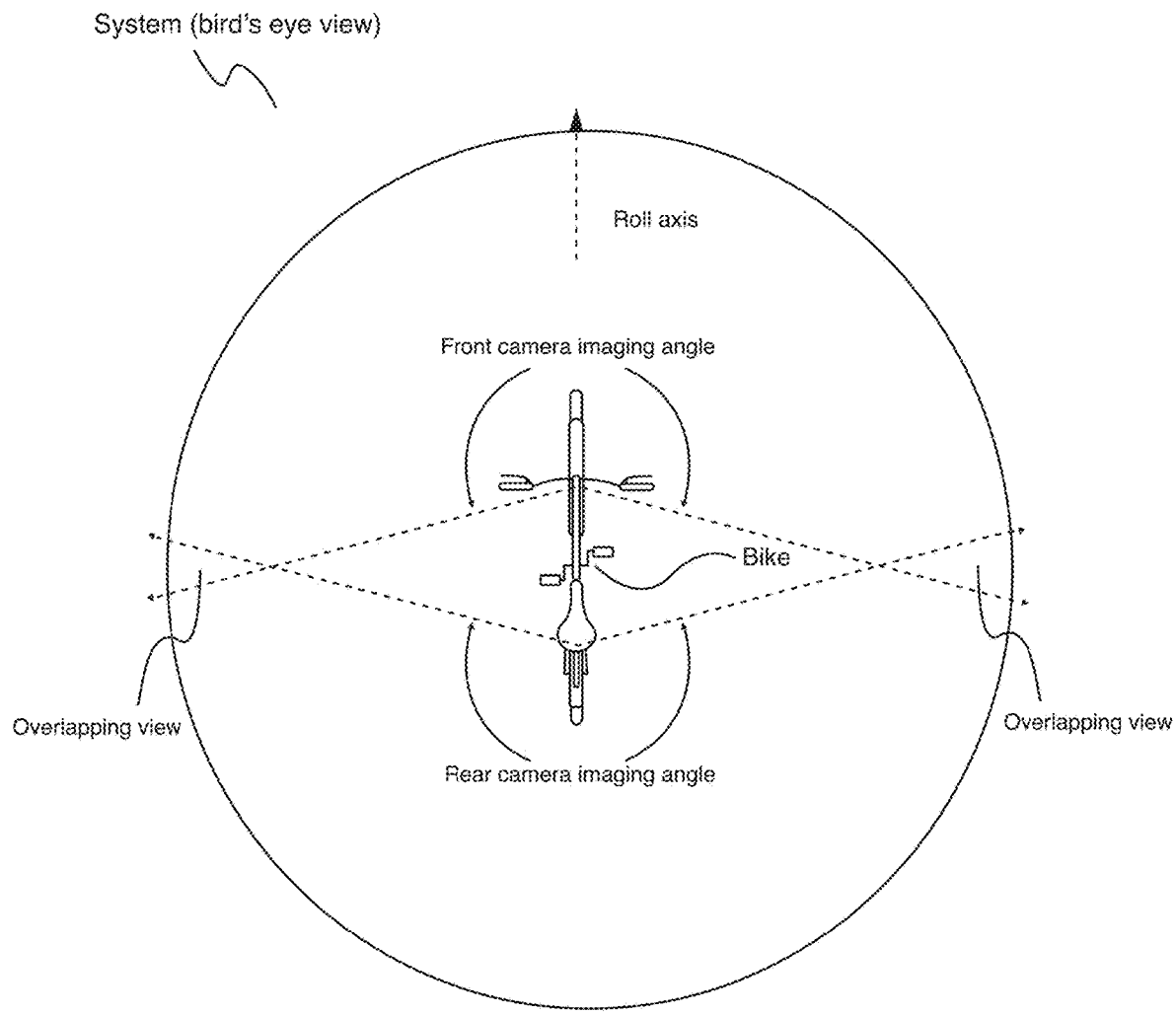
FIG. 3 is a schematic of a variation of a set of cameras in a system for providing a rider with a dynamic environmental awareness.

In a preferred set of variations (e.g., as shown in FIG. 3), the sensor subsystem includes a set of fisheye cameras which have overlapping (e.g., partially overlapping) fields of view. Alternatively, the set of cameras can non-overlapping fields of view.

The sensor subsystem further preferably includes a set of motion and/or orientation sensors, which individually and/or collectively function to correct (e.g., in S200 of the method 200) any or all of the data collected at the optical subsystem. This can, in turn, function to enable a low-cost optical subsystem to be implement, enable an optical subsystem to be implemented on a bicycle (e.g., which is subject to numerous types of motion), and/or perform any other functions.

The set of motion and/or orientation sensors can include any or all of: accelerometers, gyroscopes, magnetometers, inertial measurement units (IMUs) (e.g., including accelerometer(s), gyroscope(s), and magnetometer(s)), speedometers, altimeters, and/or any other sensors. In a first set of variations, the sensor subsystem includes a set of one or more inertial measurement units (IMUs). In specific examples, the sensor subsystem includes an IMU coupled to and/or arranged proximal to each of the set of optical sensors (e.g., cameras), such as: within the same housing, in separate housings (e.g., mounted next to each other, mounted at an offset with respect to each other, etc.), and/or at any other locations.

In a set of examples, the IMU(s) (or other motion and/or orientation sensors) can be used to adjust (e.g., correct for roll) any or all of the images collected at optical sensors (e.g., as described above).

In another set of examples, non-exclusive with the above, the IMU(s) (or other motion and/or orientation sensors) can be used to locate any or all of the set of regions (e.g., as described below) within an image, such that the placement of the regions optimally reflects the areas of the image that would be most important to analyze no matter the amount of roll experienced by the bike (e.g., when turning).

The sensor subsystem can additionally or alternatively include any other sensors, such as, but not limited to: other cameras (e.g., visual range, multispectral, hyperspectral, IR, stereoscopic, etc.) or optical sensors (e.g., photodiodes), acoustic sensors (e.g., microphones), temperature sensors, pressure sensors, flow sensors, vibration sensors, proximity sensors, chemical sensors, electromagnetic sensors, force sensors, or any other suitable type and/or combination of sensors.

The system can optionally include and/or interface with a set of computing and/or processing subsystems, which function to process any or all of the data received at the sensor subsystem. The computing and/or processing subsystem can optionally be at least partially arranged onboard a user device (e.g., mobile user device). Additionally or alternatively, any or all of the computing and/or processing subsystem can arranged outside of a user device (e.g., onboard the bike at a video processor in communication with one or more cameras), at a remote location (e.g., cloud computing subsystem), and/or at any combination of devices.

Figure 8A:
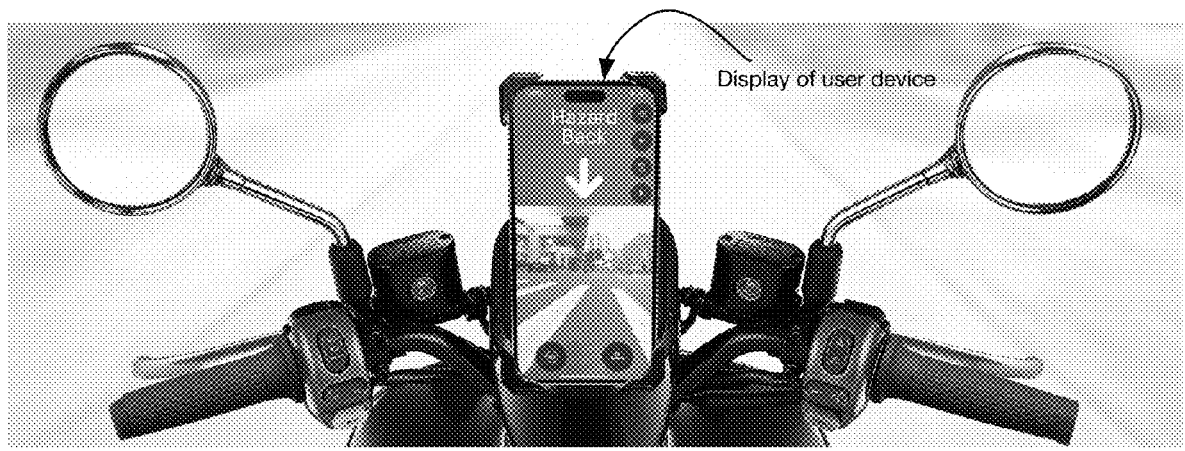
FIGS. 8A-8B depict an example alert rendered at a display of the operator.
Figure 8B:
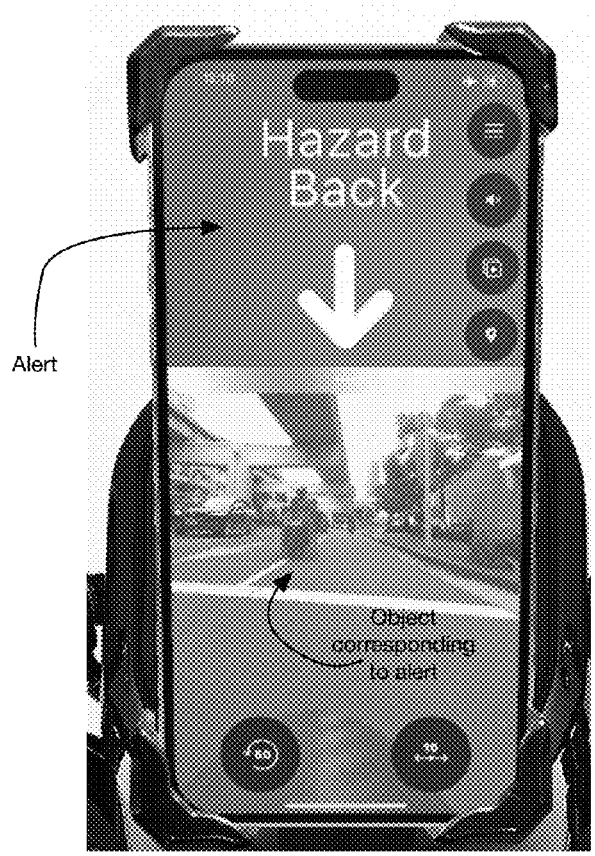

The system can optionally include and/or interface with a user device, which can function to: host an application (e.g., client application); perform any or of all of the computing and/or processing required in the method 200; provide information (e.g., alerts, directions, notifications, etc.) to the user (e.g., as shown in FIGS. 8A-8B); receive information from the user; and/or can perform any other functions. The user device is preferably a mobile user device, which can be any or all of: uncoupled relative to the bike, reversibly coupled to the bike, permanently coupled to the bike, reversibly coupled to the user, any combination, and/or otherwise configured.

The user device is preferably a mobile phone (e.g., smartphone), but can additionally or alternatively include any or all of: a tablet, mobile phone, onboard Human Machine Interface (HMI) (e.g., HMI display, embedded display, screen integrated into vehicle, etc.), laptop, watch, wearable device (e.g., glasses), or any other suitable user device. The user device can include power storage (e.g., a battery), processing systems (e.g., CPU, GPU, memory, etc.), user outputs (e.g., display, speaker, vibration mechanism, etc.), user inputs (e.g., a keyboard, touchscreen, microphone, etc.), a location system (e.g., a GPS system), sensors (e.g., optical sensors, such as light sensors and cameras, orientation sensors, such as accelerometers, gyroscopes, and altimeters, audio sensors, such as microphones, etc.), data communication system (e.g., a WiFi module, BLE, cellular module, etc.), or any other suitable component(s).

In a preferred set of variations, the system is configured to interface with a user device (e.g., smartphone) hosting a client application, wherein the user device includes one or more processors configured to perform any or all of the processing in the method 200, and the client application is configured to provide alerts to the user as produced in the method 200.

Additionally or alternatively, any or all of the processing can be performed at a separate device, multiple devices, a remote computing subsystem, and/or at any combination of locations.

The system can optionally include one or more applications (e.g., client applications) executable on the user device, which can function to perform any or all of: processing information (e.g., in the method 200); providing a user interface; receiving inputs from the user; providing outputs to the user (e.g., alerts, information about surrounding objects, alarm sounds at a speaker, etc.); and/or performing any other functions.

The application preferably runs on a user device (e.g., as described above), but can alternatively run on any other suitable computing system. The client can be a native application, a browser application, an operating system application, or any other suitable application.

The system 100 can additionally or alternatively include any other components, such as, but not limited to: one or more power sources (e.g., onboard the user device, onboard an electric bike or other powered vehicle, etc.); output devices (e.g., speakers coupled to and/or arranged proximal to the cameras to provide alerts to the user); and/or any other components.

In a first variation, the system 100 is configured to interface with a bike, the system including and/or interfacing with any or all of: a set of two (or more) fisheye cameras (e.g., monocular fisheye cameras); a set of output devices (e.g., speakers coupled to the cameras); a user interface (e.g., provided at a client application executing on a user device); a processing subsystem (e.g., at a user device, a video processor with artificial intelligence [AI] modules/programs coupled to and/or in communication with one or more cameras, etc.); and a power source (e.g., integrated in the bike, coupled to the bike, etc.). Additionally or alternatively, the system 100 can include and/or interface with any other components.

In a first set of specific examples, the system 100 is configured to interface with an electric bike, where a power source integrated into the electric bike is used in powering any or all components of the system.

In a second set of specific examples, the system 100 is configured to interface with a manual (e.g., non-powered) bike, where the system can include one or supplementary power sources (e.g., coupled to/reversibly coupled to the bike, onboard the user device, etc.).

Figure 5:
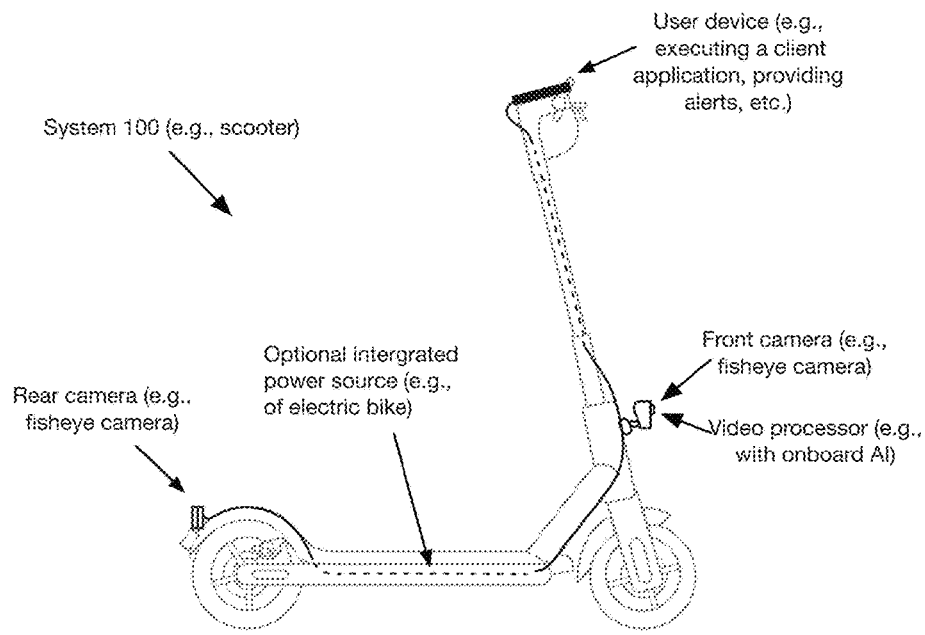
FIG. 5 depicts a variation of a system for providing a rider with a dynamic environmental awareness.
Figure 6:
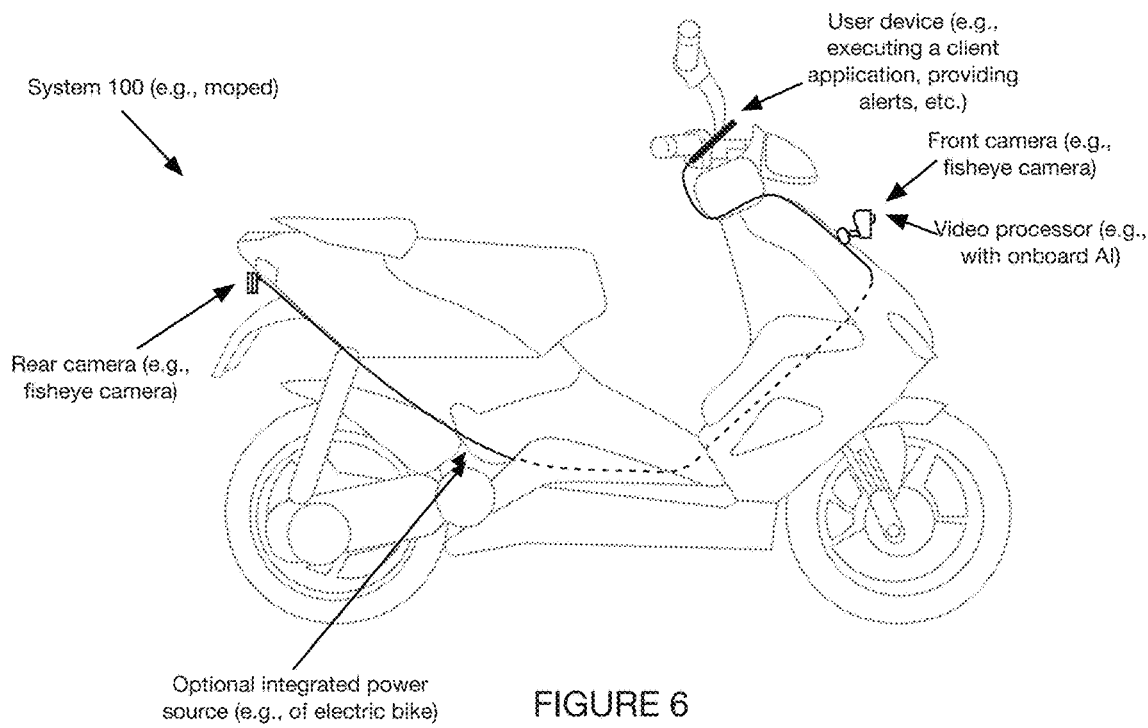
FIG. 6 depicts a variation of a system for providing a rider with a dynamic environmental awareness.

In a second variation, the system 100 is configured to interface with any other vehicle (e.g., as shown in FIG. 5, as shown in FIG. 6, etc.).

4. Method

As shown in FIG. 2, a method 200 for providing a rider with a dynamic environmental awareness can include: receiving data from a set of sensors S100; correcting data S200; identifying a set of regions in the data S300; and processing the set of regions to detect a set of objects S400. Additionally or alternatively, the method 200 can include triggering an action based on the set of objects S500 and/or any other suitable processes performed in any suitable order. The method 200 can be performed with a system 100 as described above and/or any other suitable system.

The method 200 preferably functions to dynamically assess the environment of a rider and provide alerts regarding dangerous situations to the rider accordingly. Additionally or alternatively, the method 200 can perform any other functions.

The method 200 is preferably performed multiple times during a trip of the vehicle, such as: continuously, at a predetermined frequency, at a random set of intervals, in response to a trigger, and/or at any other suitable times. In some examples, for instance, S100 and/or any other processes of the method is repeated according to a predetermined frequency (e.g., at least once per second, at least once per half second, at least once per 0.25 seconds, at least once per 0.1 seconds, etc.) during a trip of the vehicle. Additionally or alternatively, any or all of the method 200 can be performed at any other suitable times.

Initiating the method 200 can optionally include any or all of: detecting that a speed of the vehicle has reached and/or exceeded a predetermined threshold; detecting that the vehicle has traversed a minimum distance threshold; detecting motion (e.g., with a motion sensor, with an IMU, etc.); detecting motion for at least a predetermined time threshold; detecting breach of a geofence; receiving user input (e.g., user initiating a trip at a user interface); and/or a trip can be otherwise suitably initiated.

The method 200 is preferably at least partially performed with a set of computing and/or processing subsystems (e.g., as described above), which can be any or all of: coupled to the vehicle; onboard a user device; remotely located (e.g., at a cloud computing system); distributed among multiple locations; and/or otherwise suitably located or arranged.

4.1 Method—Receiving Data from a Set of Sensors S100

The method 200 can include receiving data from a set of sensors S100, which functions to receive information with which to perform any or all of the remaining processes of the method 200. Additionally or alternatively, S100 can function to receive information from low-cost and/or retrofittable equipment, where remaining processes of the method 200 are configured to produce accurate and actionable analytics with such data. Further additionally or alternatively, S100 can perform any other functions.

S100 is preferably performed at least initially during the method 200 and optionally multiple times (e.g., at a predetermined frequency, continuously, at random intervals, etc.) during the method 200 and/or operation of the vehicle. Additionally or alternatively, S100 can be performed in response to another process of the method 200, in response to a trigger, and/or at any other times.

S100 is preferably performed with a set of sensors (e.g., as described above), and further preferably with at least a set of cameras onboard the vehicle. In preferred variations, for instance, one or more images (e.g., single image, a video stream, etc.) is collected in S100 from a set of multiple cameras onboard the vehicle, such as, but not limited to, a front and a rear fisheye camera, side cameras, and/or any other cameras.

In a preferred set of variants (e.g., as shown in FIG. 3), a first camera (e.g., monocular camera) is configured to image a forward view of the operator, and a second camera is configured to image a rear view of the operator. The data collected from these cameras is preferably at least partially overlapping (e.g., as shown in FIG. 3), but can alternatively be non-overlapping.

In an alternative set of variants, a first camera (e.g., monocular camera) is configured to image a forward view of the operator, a second camera is configured to image a rear view of the operator, and one or more additional cameras are directed toward sides of the operator (e.g., mounted to side(s) of the vehicle).

In yet other variants, multiple cameras can be configured to image the same view or similar views (e.g., for redundancy).

Additionally or alternatively, any other views can be suitably sampled.

Additionally or alternatively, S100 can include collecting data from any suitable sensors, such as, but not limited to: microphones, location sensors, and/or any other sensors.

The set of sensors are preferably coupled to the vehicle, but can additionally or alternatively be arranged onboard a user device, in an environment of the vehicle, coupled to the user, and/or otherwise arranged.

S100 can optionally include transmitting any or all of the sensor data to one or more computing and/or processing subsystems of the system (e.g., onboard the user device, offboard the vehicle, etc.). Additionally or alternatively, any or all of the data can be processed at a processing subsystem integrated with and/or coupled to any or all of the sensors (e.g., video processor coupled to one or more cameras).

S100 can optionally include receiving supplementary data S105, which can optionally be used in any or all subsequent processes of the method 200. The supplementary data can include, but is not limited to, any or all of: historical data (e.g., retrieved from a database, local memory, etc.), such as previously collected sensor data (e.g., last sampled image) and/or outputs of a previous iteration of one or more processes of the method 200; data from another vehicle (e.g., sensor data from a nearby vehicle such as an upstream vehicle); environmental data and/or 3rd party data (e.g., weather data, temperature data, traffic data, etc.); some or all of the sensor data collected in S100; and/or any other information.

The supplementary data can be used for any or all of: determining features (e.g., sizing, placement, shape, etc.) of any or all of the set of regions in S300; assessing and/or scaling a risk of an environment in S400 and/or S500 (e.g., expanding a zone of risk if the roads are slippery and the vehicle is predicted to have a high likelihood of slipping, scaling a risk higher if vehicle is in a heavy traffic area, etc.); tracking objects between frames; providing an alert in S500 (e.g., increasing volume of alert if the operator is in a noisy environment; providing an audible alert instead of visual if there is suspected glare; providing a visual alert rather than an audible alert in noisy environments, etc.); and/or can be otherwise suitably used.

S100 can additionally or alternatively include any other suitable processes.

4.2 Method—Correcting the Data S200

The method 200 can optionally include correcting the data S200, which can function to: prepare the data for further processing in the method 200 (e.g., correct for motions of the vehicle to which any or all of the sensors are coupled such as roll of a bike, correct for warping caused by using a fisheye camera or other camera with warping effects, etc.); minimize a computational expense and/or computational time associated with any or all remaining processes of the method 200; and/or can perform any other functions.

S200 is preferably performed in response to S100 and prior to any or all of S400 (e.g., tracking of identified objects in the bike's environment in S400). Additionally or alternatively, S200 can be performed at any or all of: prior to S300, in response to S300, after S300, prior to S400, after S400, multiple times during the method 200, and/or at any other times.

S200 is preferably performed, at each iteration of the method, based on an image (e.g., frame of a video/feed) received at each camera onboard the vehicle. In variants, for instance, S200 is performed based on the image and/or image data received at each of a front and rear camera of the vehicle. Additionally or alternatively, any number of cameras and/or types of cameras can be used in providing image data. Further additionally or alternatively, S200 can be performed, at each iteration, based on multiple images from each camera (e.g., a video feed), based on data from other sensors, based on supplementary data, and/or based on any other information.

In some variations, for instance, S200 is performed at multiple times during an iteration and/or each iteration of the method 200, which functions to optimize for (e.g., minimize) a computational expense associated with any or all of the remaining processes. In some variations, for instance, a first portion of S200 is performed prior to S300, where a second portion of S200 is performed during and/or after S400 (e.g., based on a set of detected objects determined in S400), such that the computationally intensive parts of S200 do not need to performed on the entire image(s) and/or video (but rather on relevant intermediate outputs produced along the way).

Alternatively, S200 can be performed a single time and/or at any other times (e.g., in response to S300).

S200 can optionally include correcting for a roll of the bike (or other vehicle), which refers to a rotation about a front-to-back axis of the vehicle (e.g., as shown in FIG. 3). This functions to account for the amount (e.g., angle) of tilt that the bike experiences during its operation, which can be especially pronounced as the user is turning and/or performing any other actions. The roll of the bike is preferably determined based on one or more orientation sensors (e.g., IMU, gyroscope, etc.) coupled to the bike (e.g., and processed at the user device), but can additionally or alternatively be performed with any other data.

Additionally or alternatively, any other angles of the vehicle (e.g., pitch, yaw, etc.) can be accounted for in S200.

Figure 4A:
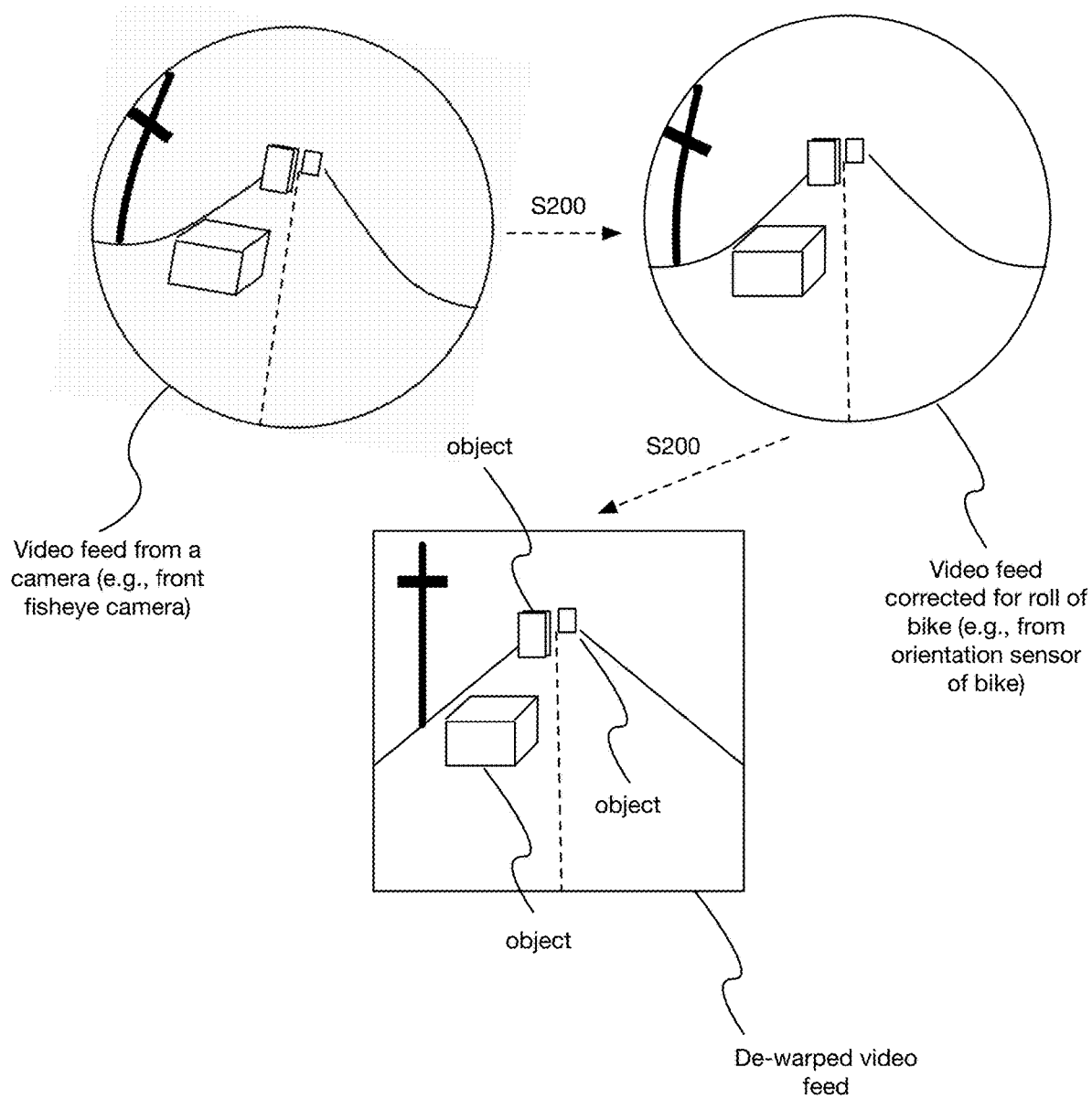
FIGS. 4A-4K depict an example implementation of a method for providing a rider with a dynamic environmental awareness.
Figure 4B:
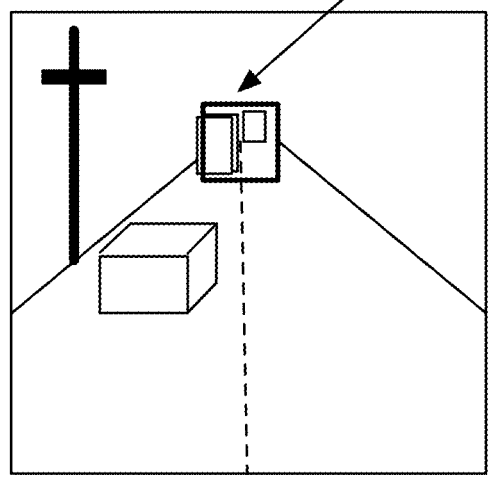
Figure 4C:
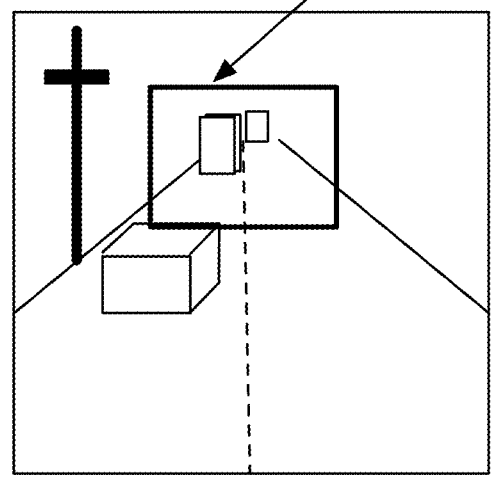
Figure 4D:
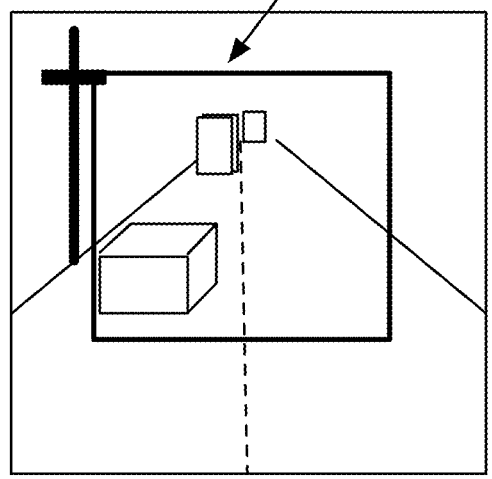
Figure 4E:
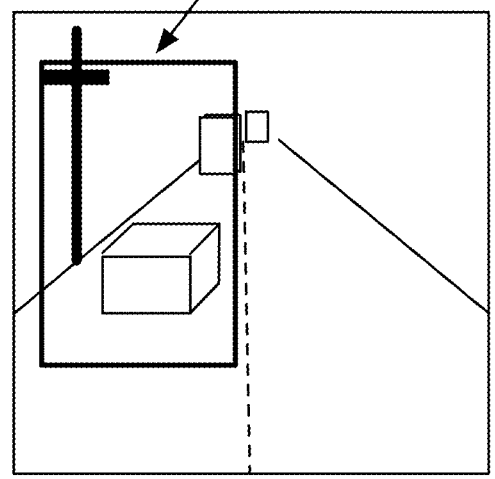
Figure 4F:
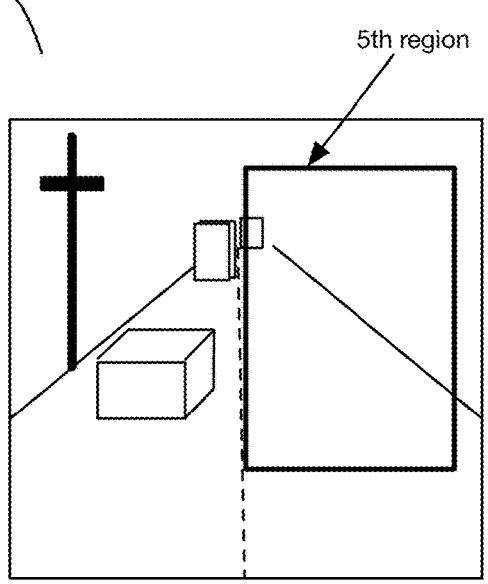
Figure 4G:
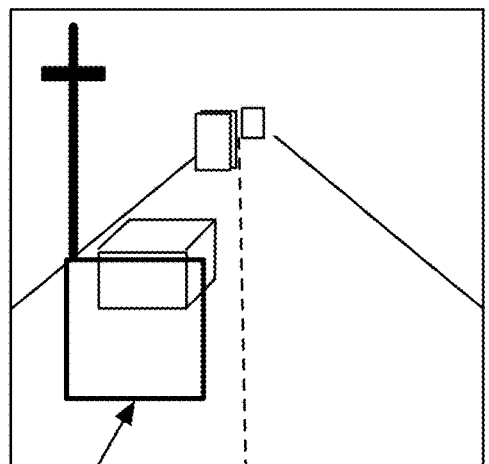
Figure 4H:
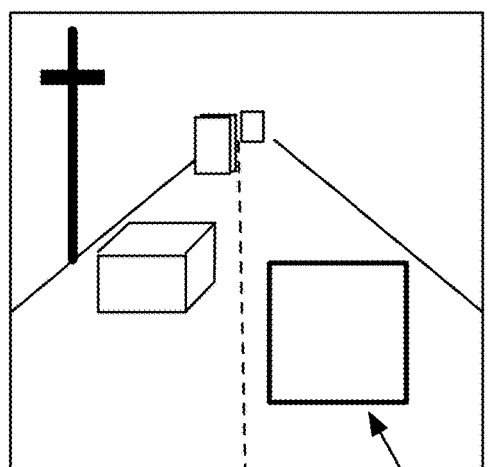
Figure 4I:
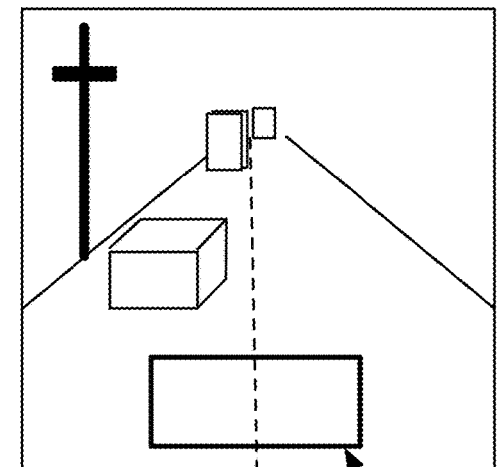

In a preferred set of variations (e.g., as shown in FIG. 4A), S200 includes rotating each of the images collected at a set of cameras onboard the vehicle based on data (e.g., roll angle measurement) collected at a set of IMUs (and/or other orientation/motion sensors) arranged proximal to each of and/or a subset of the set of cameras. Additionally or alternatively, the roll correction process can be performed on any number of intermediate outputs (e.g., rather than a video stream), such as a set of detected objects in the video stream.

In an alternative set of variations, S200 is performed in absence of correcting for roll, which can function to reduce computational requirements (e.g., computational cost, spend, load, etc.) associated with S200 and/or the method 200, defer computational requirements until later in the method 200, correct for roll later in the method 200 (e.g., as part of a trained model evaluation process), and/or otherwise produce suitable image data.

Figure 12A:
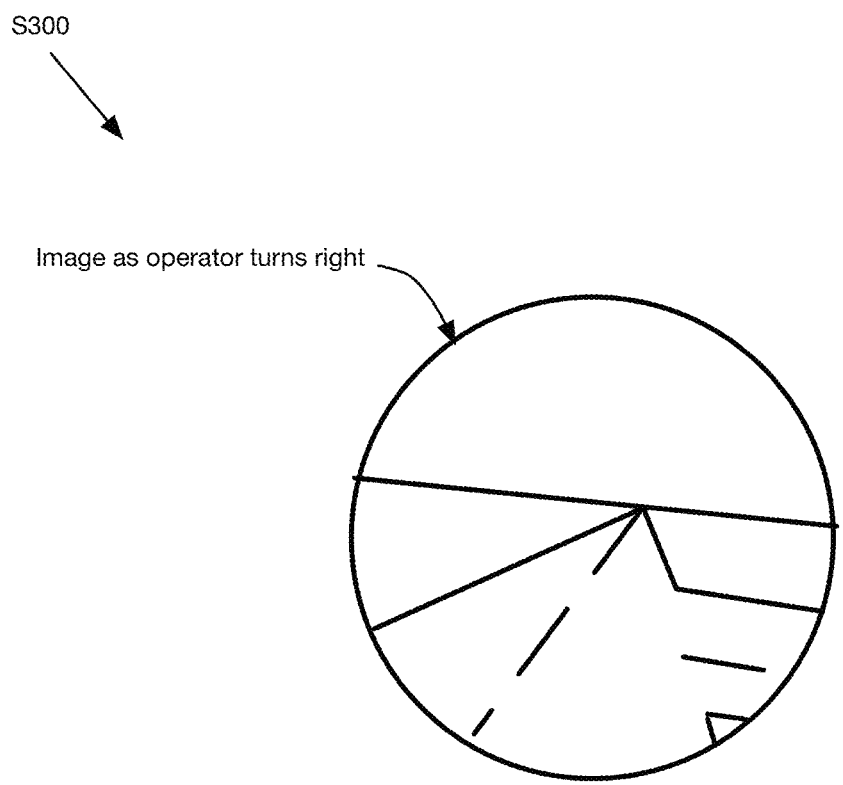
FIGS. 12A-12B depict a 3rd variant of a workflow for S300.
Figure 12B:
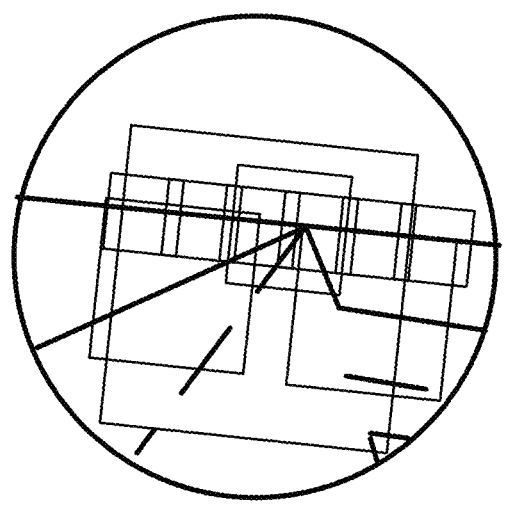

In yet other variations, S200 detects a roll angle (e.g., with an IMU) to be used in locating regions within an image (e.g., as part of S300). For instance, in an event that a vehicle is experiencing a non-zero roll angle, such as while turning, the areas in the image that are of priority and/or of highest priority can be determined and/or adjusted in light of this information (e.g., turning radius from an IMU, turning radius derived from a roll angle of an IMU, roll angle of an IMU, etc.) (e.g., to increase accuracy of the alerts, to ensure that the objects of highest interest/importance are identified, etc.). In a particular example (e.g., as shown in FIGS. 12A and 12B), any or all of region size, number, shape, location, and/or any other features of the regions can be adjusted and/or defined to optimize detection of the most relevant risks to a rider while turning. For instance, regions can be spaced relative to an adjusted location (e.g., predicted location based on roll/turn radius) of a vanishing point and/or horizon line (e.g., as shown in FIGS. 10A-10D); regions can be shifted and/or changed in number to account for the right side of the image being a higher contributor of risk during a right turn than the left side of the image; regions can be arranged and/or sized differently to account for a different proximity of objects in the left side vs. the right side during a turn; and/or the regions can be otherwise selected and/or placed.

S200 can optionally additionally or alternatively include de-warping each of the images collected at the set of cameras (e.g., as shown in FIG. 4A), which functions to remove the effects of a fisheye (or other wide angle) lens of each camera. The de-warping process is preferably performed with a predetermined algorithm and/or mapping (e.g., an un-trained and/or non-trained process), but can additionally or alternatively be performed with a trained model, dynamically determined process, and/or any other number of processes. Additionally or alternatively, a de-warping process can be performed on any number of intermediate outputs (e.g., rather than an image and/or video stream), such as for a set of detected objects in the image (e.g., as detected with a downstream process of the method 200).

The de-warping process can be performed: after a roll correction process, prior to a roll correction process, in absence of a roll correction process, and/or at any other times.

S200 preferably includes a stabilization process, which functions to stabilize any or all of the image information (e.g., relative to the motions [e.g., bumping, bouncing, tilting, etc.] of the bike) received in the method 200 and/or any information derived from the images during the method 200. The stabilization process is preferably performed with sensor data, and further preferably accelerometer and gyroscope data (e.g., IMU data, fused data, etc.) collected at the bike, but can additionally or alternatively be performed with any number of algorithms, models, and/or tools.

In a preferred set of variations, the stabilization process is performed for a detected set of objects (e.g., bounding boxes produced in S400) rather than the whole image itself, which functions to stabilize data prior to performing one or more subsequent computationally-involved processes of the method 200 (e.g., processing of the objects to perform 3D tracking), but minimizes the required computation as compared with stabilizing an entire image, since much of the image will not be relevant for providing alerts.

Additionally or alternatively, S200 can include any other suitable processes.

In a first set of variations, a portion of S200 is optionally performed at a first time in the method 200 and another portion of S200 is optionally performed at a later time during the method 200.

In specific examples, for instance, a roll correction process and/or a de-warping process (e.g., for embodiments of the system including fisheye cameras) is performed at a first instance of S200 prior to S300, and a second set of processes (e.g., image stabilization process) is performed on any or all of the outputs produced during or after S300 (e.g., bounding boxes produced in S400).

In other specific examples, S200 is performed in absence of one or both of the roll correction and de-warping process, and includes a stabilization process (e.g., performed after S400, performed prior to S300, performed prior to S400, etc.).

In alternative variations, all of S200 is performed at a single time (e.g., prior to S300, after S300, etc.) during the method 200.

Additionally or alternatively, S200 can include any other suitable processes performed in any suitable order and/or at any suitable times.

4.3 Method—Identifying a Set of Regions in the Data S300

The method 200 can include identifying a set of regions in the data S300, which functions to identify and prioritize regions of interest for further processing in the method 200, which can in turn function to: alert the operator to the most relevant (e.g., most immediate, most likely, highest consequence, etc.) risks. Additionally, S300 can function to minimize a computational cost associated with any or all of the remaining processes of the method 200 (e.g., by only covering a portion of each image with regions for further processing, by sizing the regions differently based on priority, etc.). Additionally or alternatively, S300 can confer any other suitable benefits.

S300 is preferably performed for each image received in S100, and optionally pre-processed and/or processed in S200, but can additionally or alternatively be performed for a portion of images (e.g., only images received from a portion of the cameras, depending on a placement and/or direction associated with the cameras), and/or based on any other information.

S300 can optionally be performed based on at least a portion of S200, such as a roll correction process and/or a de-warping process, but can additionally or alternatively be performed based on all of S200, in absence of S200, prior to any or all of S200, multiple times during the method 200, in response to another process of the method 200, and/or at any other suitable times. In a preferred set of variations, for instance, a roll correction process is performed prior to S300 such that the regions are identified based on corrected (e.g., straightened image data). Alternatively, the set of regions can be corrected later in the method 200 (e.g., based on the roll), determined with uncorrected (e.g., raw) data, and/or otherwise determined. Additionally or alternatively, S300 can be performed in response to both a roll correction process and a de-warping process, in absence of either or both of a roll correction or a de-warping process, in response to any other processes, in absence of S200, and/or at any other times.

The regions can be predetermined, dynamically determined, a combination of predetermined and dynamically determined (e.g., a portion is predetermined and another portion is dynamically determined, regions are predetermined and then dynamically adjusted, etc.), and/or otherwise suitably determined.

The regions can differ between images (e.g., differ between an image from a forward-facing camera and an image from a rear-facing camera, differ between images from the same camera over time, etc.), stay consistent between images, be a combination, and/or be otherwise suitably configured.

S300 can optionally include one or more computer vision processes (e.g., with a trained model, machine learning model, deep learning model, neural network, etc.), but can additionally or alternatively be performed with any suitable models and/or algorithms and/or tools. In some variations, for instance a computer vision process is performed to detect a set of landmarks in the image data (e.g., lane detection, vanishing point detection, etc.), such that any or all of the regions can be located and/or sized according to the set of landmarks. Alternatively, the regions can be placed absent of such information and/or processes (e.g., placed at predetermined locations).

In a preferred set of variations, for instance, the regions are determined and placed absent of any or all of: individually processing each image to determine a set of landmarks and/or features, applying a computer vision process to any or all images, dynamically determining information from the current image to inform the set of regions, and/or any other computationally intensive processes. Alternatively, any or all regions can be chosen and/or placed based on processing one or more images (and/or one or more parts of an image) with a computer vision process and/or other process.

In a first set of examples, for instance, the features (e.g., size, shape, location, etc.) of the set of regions are fixed and do not vary between images and/or between iterations of the method. For instance, a first region can be placed at an approximate (e.g., predicted) location of a vanishing point of the image (e.g., average location of vanishing point in a corpus of images, center of image, etc.), where the other regions are spaced and sized in a predetermined manner relative to this initial region. An example is shown in FIGS. 10A-10D.

Figure 11:
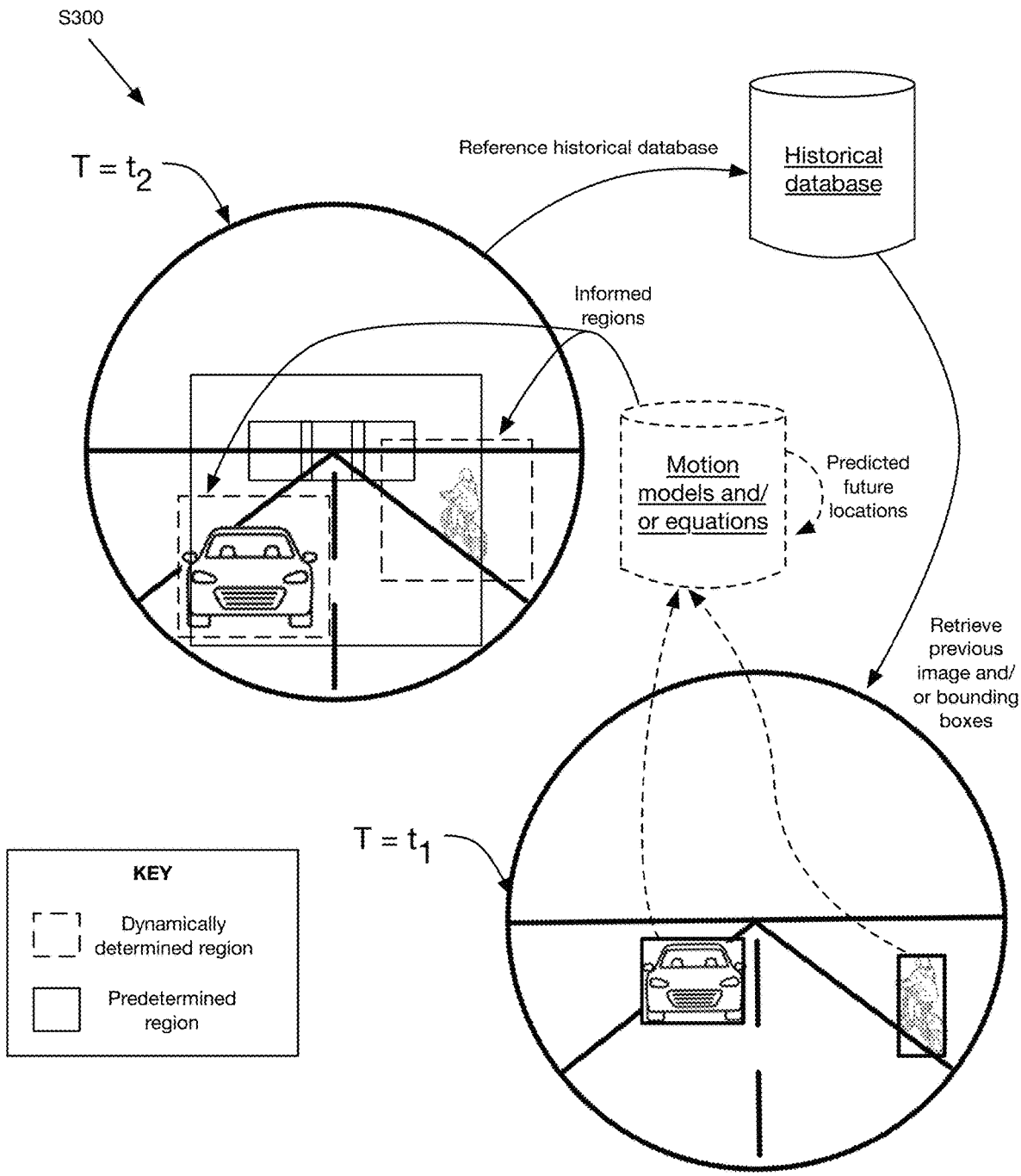
FIG. 11 depicts a 2nd variant of a workflow for S300.

In a second set of examples, non-exclusive with the first, historical information (e.g., previous images from the same trip, bounding boxes from the most recent set of images taken during the trip, etc.) can be utilized to inform how to place and/or which features to prescribe to any or all of the regions in the image. For instance, based on bounding boxes and/or triggered alerts resulting from one or more previous frames, the regions in a current image can be configured to sufficiently and/or optimally capture the locations in the image that are most likely to contain an object and/or a high-risk object. In a specific example (e.g., as shown in FIG. 11), a region can be centered on or near (e.g., based on a detected and/or approximate and/or assumed speed and heading for the object) the location of a previously detected object within the image. Additionally or alternatively, a size and/or number of regions at that location can be configured to sufficiently capture—with appropriate resolution—that object. An example is shown in FIG. 11, where a previous image and/or its produced bounding boxes can be retrieved from a database and used to determine any or all of the regions in the current image, where an optional model and/or equation evaluation process can be performed to predict current locations of the detected objects in the current image (e.g., based on predicted speed from additional previous images, based on an estimated speed corresponding to an object classification, etc.). Alternatively, the previous locations can be used (e.g., to center a large bounding box), and/or the region placement, size, and/or other features can be otherwise suitably determined.

In a third set of examples, non-exclusive with those above, sensor data and/or supplementary data (e.g., associated with the image time stamp, collected previously to the image time stamp, collected after the image time stamp, etc.) can be used to determine locations and/or features of the regions. As described above (e.g., as shown in FIGS. 12A-12B), for instance, a turning or tilt parameter (e.g., roll angle, turning/angular velocity, angular acceleration, turn radius, etc.) of the vehicle (e.g., as detected using IMU data) can be used to determine the arrangement of regions that most optimally captures the important locations to consider while the vehicle is turning. An example is shown in FIGS. 12A-12B.

Each of the set of regions (equivalently referred to herein as viewports) preferably prescribes a particular portion of an image (e.g., image from a video stream of a camera), such as shown in the regions of FIGS. 4A-4K. The regions and associated features (e.g., number of regions, size of each region, location of each region, etc.) can be any or all of: predetermined, dynamically determined, or any combination. Additionally or alternatively, the regions can be otherwise determined and/or arranged.

The set of regions can be any or all of: configured to collectively cover the entire image, configured to cover only a portion of the entire image (e.g., only regions which include road and/or sidewalk, only regions which are potentially dangerous to the rider, etc.), and/or any combination.

In a preferred set of variants, the set of regions collectively covers only a portion of the image, rather than the entire image. This can function to confer computational advantages, such as computational savings in comparison with a process involving processing all parts of an image. In examples, the set of regions collectively does not cover at least a portion of the image above a horizon line (e.g., sky) and/or any other areas which would not pose a risk and/or an immediate risk (e.g., within a predetermined time frame) to the operator. As described above, this can be enabled through an optimal selection of locations and features of the regions within the image.

The set of regions can be different between images from different cameras, the same for all images, or any combination. In a first set of examples in a variant including both a forward-facing and rear-facing camera, the regions are predetermined and placed in the same places and with the same features in both images. In second set of examples of the variant, a first set of predetermined regions is placed in each image from the forward-facing camera, and a second set of predetermined regions is placed in each image from the rear-facing camera, where the first and second sets of predetermined regions are different.

Figure 4J:
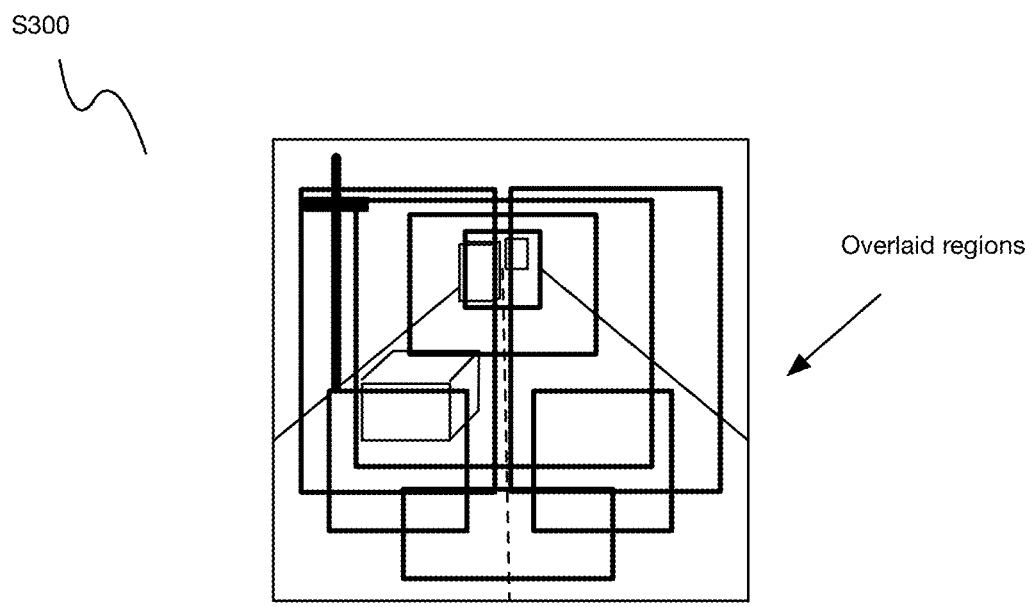
Figure 4K:
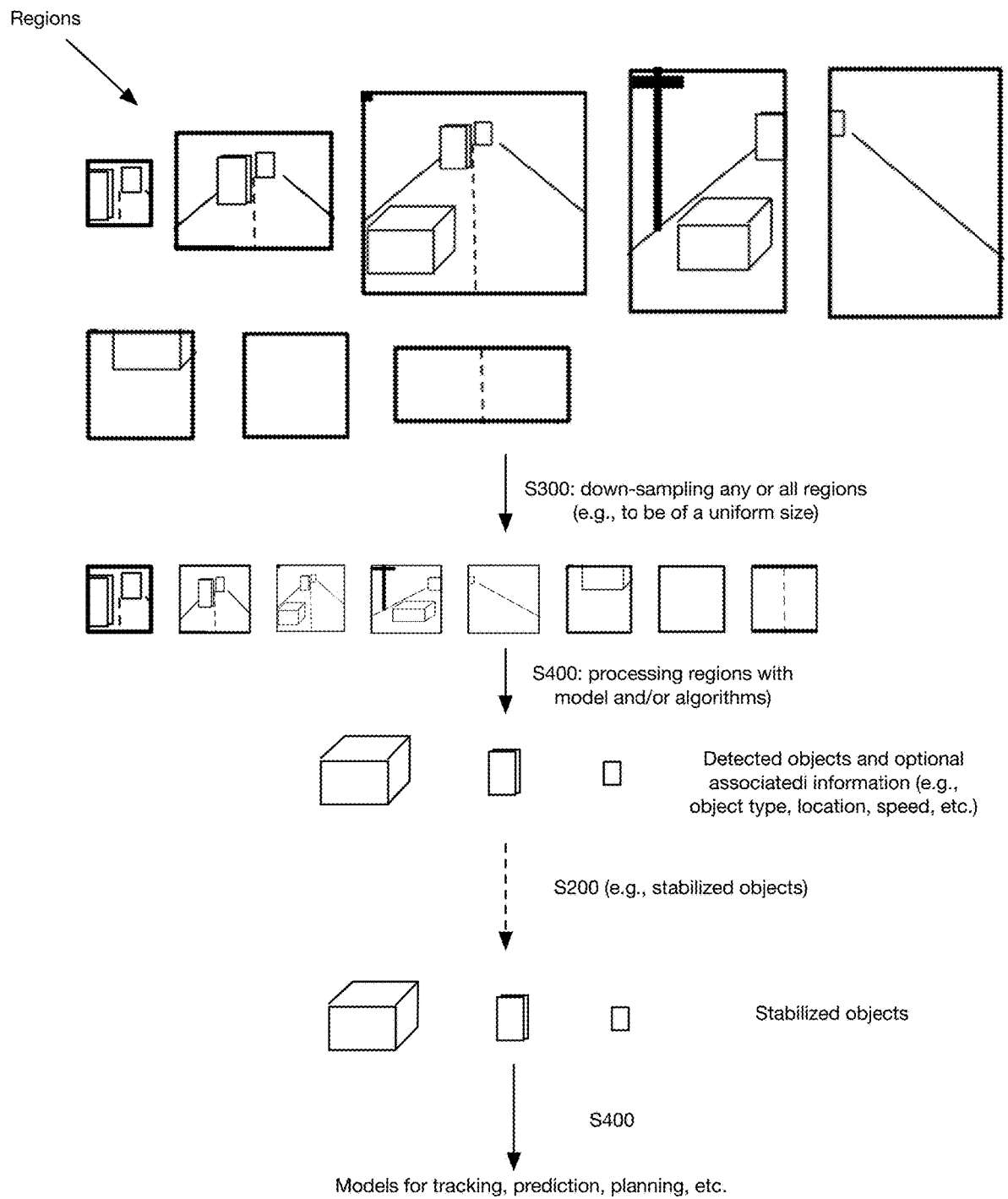

The set of regions are preferably at least partially overlapping with each other (e.g., as shown in FIG. 4J), which functions to enable an accurate and robust detection of objects in subsequent processes of the method 200. In a demonstrative example in FIGS. 4A-4K, for instance, if it is unclear if an object is present in the $5^{th}$ region, but there is high confidence that an object is present in the $1^{st}$, $2^{nd}$, and $3^{rd}$ regions—which overlap with the $5^{th}$ region-then an object can be detected accordingly. In other examples, the regions for an image produced by a first camera are at least partially overlapping with the regions for an image produced by a second camera (e.g., at the same point of time).

The overlapping can be lateral where the regions overlap along their sides; vertical where a bottom of one region overlaps with a top of a below region; overlap diagonally where corners of regions overlap; overlap along any axes; and/or any combination of overlapping can occur. An overlap can occur between 2 regions, more than 2 regions, and/or any number of regions. Further, in some variants, a region can fully encompass one or more smaller regions, fully encompass one or more regions and partially encompass other regions, and/or the regions can be otherwise suitably arranged relative to each other. Additionally or alternatively, overlapping regions can overlap with less than 50% of each of their total areas (e.g., less than 25%, less than 20%, less than 15%, less than 10%, less than 5%, etc.).

Additionally or alternatively, each of the set of regions can be processed to perform object detection in a binary fashion in S400 (e.g., to preserve computational resources), such that the location of a detected object can be determined based on the particular way in which the regions in which an object is detected overlap with each other.

Further additionally or alternatively, any or all of the regions can be non-overlapping and/or otherwise processed.

The set of regions are preferably of various sizes, wherein regions located at higher priority locations within the image cover a smaller area of the image than those located at lower priority locations, which functions to enable these higher priority regions to have a higher resolution for further processing (e.g., and decrease the computational spend/time on lower priority regions). Higher priority can refer to any or all of: regions which would include the hardest-to-detect objects (e.g., based on distance from the rider); regions which would be the most dangerous to the rider; and/or any other scenarios. In some variations (e.g., as shown in FIGS. 4A-4K), a computer vision process is performed to detect a vanishing point in the image (e.g., which contain the smallest objects) and center a smallest-sized region at that point. Any or all of the other regions can optionally be placed and/or sized based on this region. Additionally or alternatively, any or all of the regions can be sized and/or placed based on predetermined parameters. Further additionally or alternatively, the highest priority region can be otherwise sized, configured to be included in multiple regions (e.g., overlapping regions, non-overlapping regions, etc.), and/or be otherwise used in selecting the regions.

Any or all of the regions can optionally be down-sampled (e.g., to all be of the same final size), such that low priority regions have a lower final resolution than the high priority regions. Additionally or alternatively, the regions can be otherwise processed. In some variants, for instance, the method includes down-sampling any or all of the regions, meaning down-sampling the portion of the image contained in each of these regions, such that all the regions have the same or similar final size (e.g., pixel size), thereby causing differently sized regions to have different resolutions (with the smallest regions having the highest resolution) after the down-sampling process.

Additionally or alternatively, regions can be otherwise suitably pre-processed and/or processed.

Figure 9A:
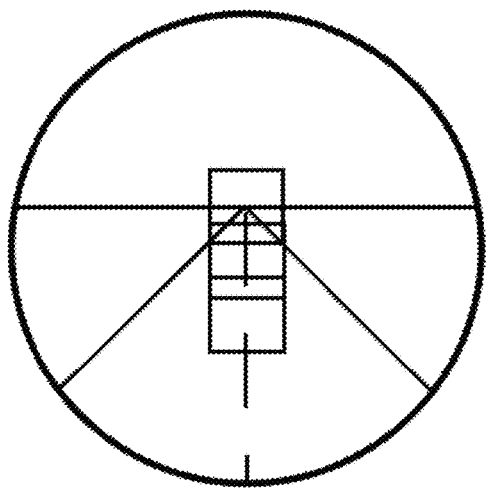
FIGS. 9A-9D depict examples of region placement relative to an image during S300 of the method.
Figure 9B:
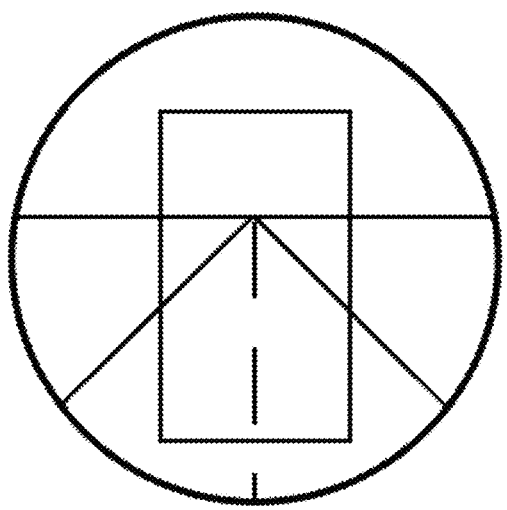
Figure 9C:
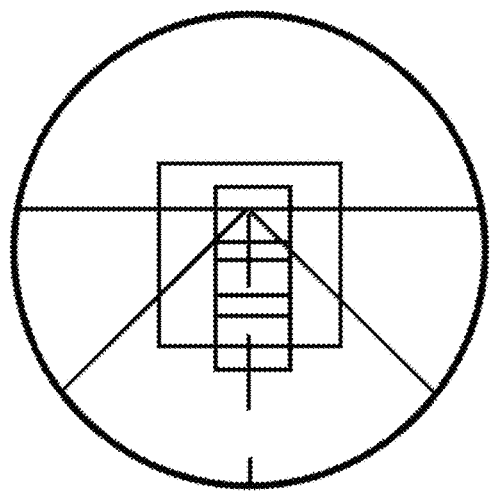
Figure 9D:
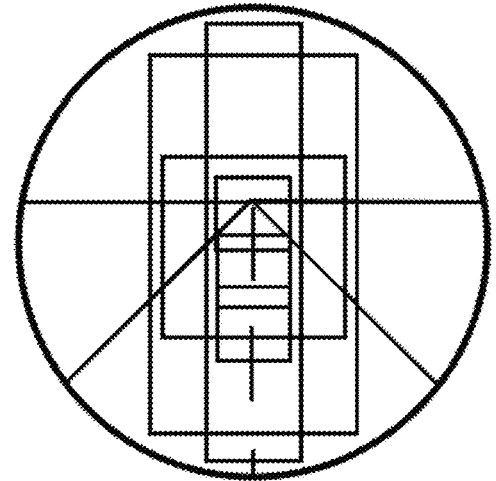
Figure 10A:
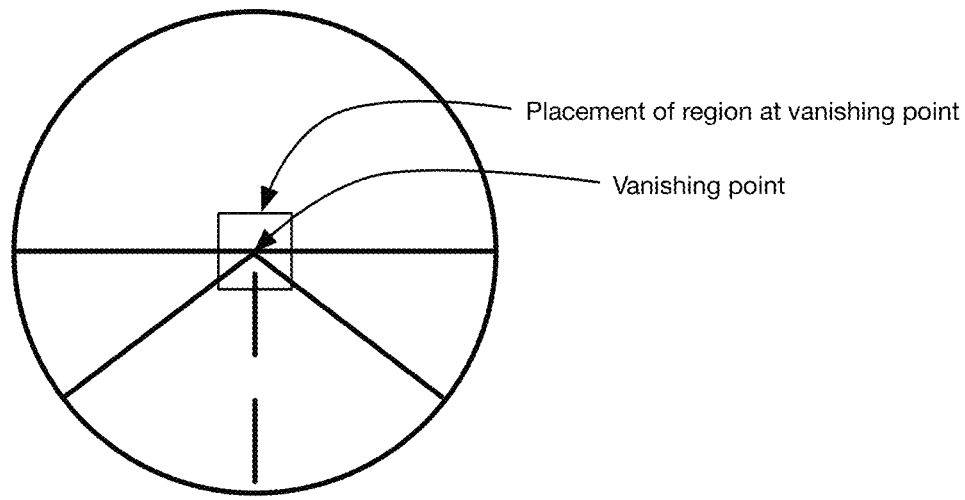
FIGS. 10A-10D depicts a 1st variant of a workflow for S300.
Figure 10B:
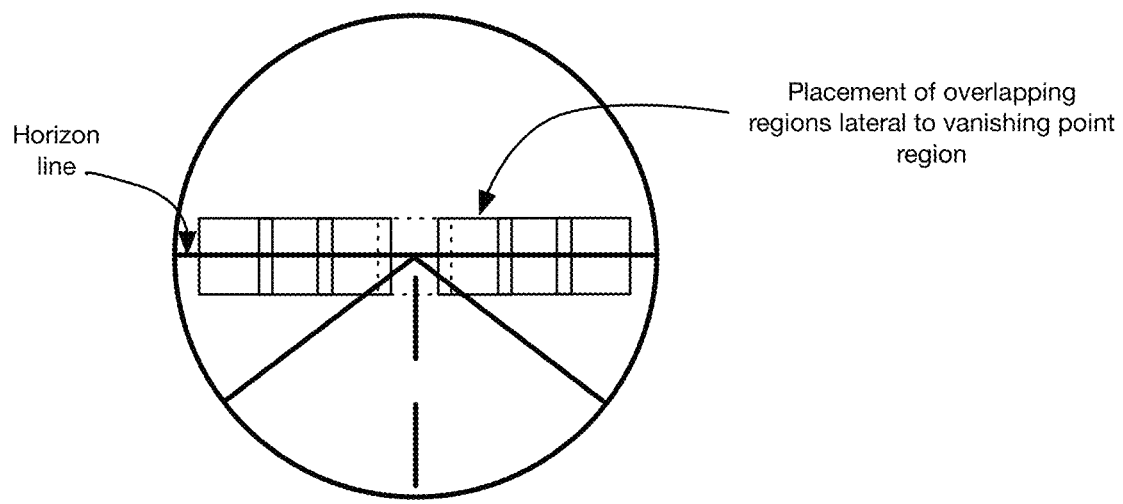
Figure 10C:
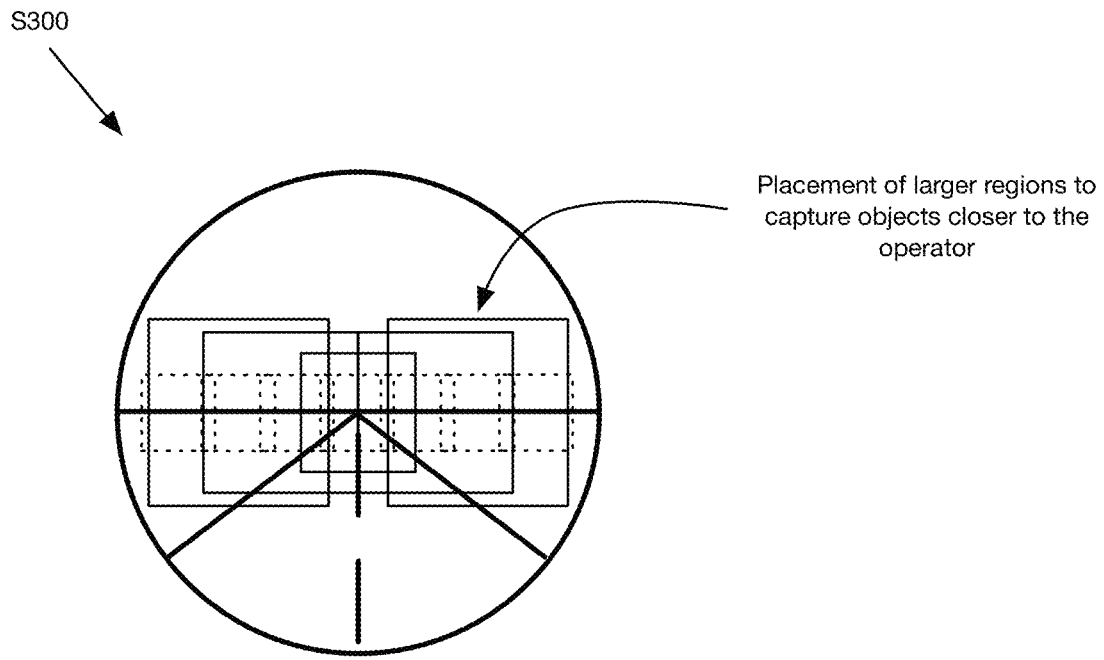
Figure 10D:
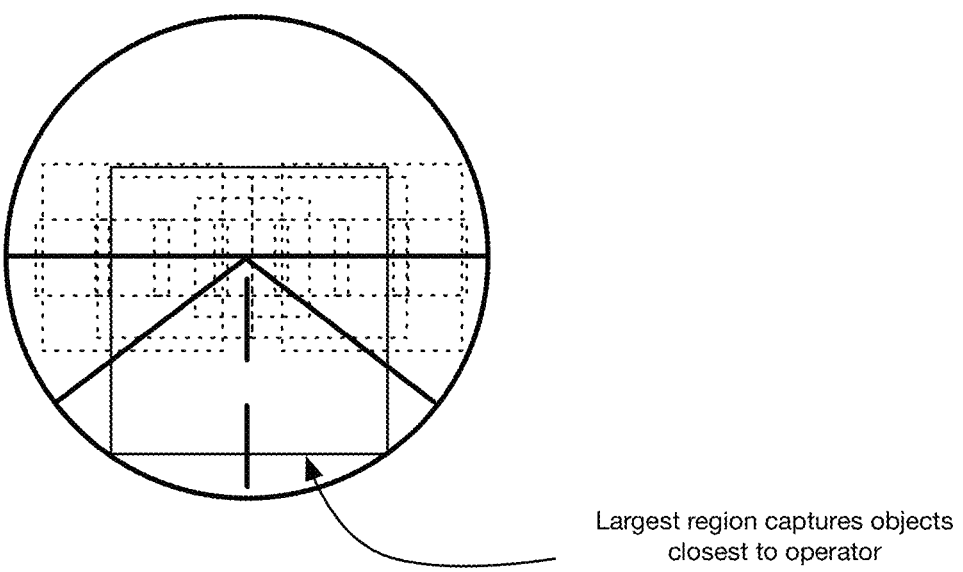

The regions can have any suitable shape, such as, but not limited to: square (e.g., as shown in FIG. 9A, as shown in FIG. 9C), rectangular (e.g., as shown in FIG. 9B), circular, ovoid, organically shaped, dynamically shaped (e.g., to encompass an image-specific feature), having a combination of shapes (e.g., as shown in FIG. 9D), and/or otherwise suitably shaped.

Examples of any or all regions present in an image are shown in FIGS. 9A-9D.

In a preferred set of variations, the set of regions are at least partially overlapping (e.g., with each other in each video stream, with regions of a different video stream such as front camera regions at least partially overlapping with rear camera regions, etc.) and of various sizes, wherein regions of highest priority (e.g., have the highest potential and/or likelihood of causing risk to the rider, at a location which the rider is most likely to not look at and/or not see well, etc.) have the highest resolution. Additionally or alternatively, any or all of the regions can be: non-overlapping, of the same size, otherwise configured, and/or any combination.

Additionally or alternatively, S300 can include any other suitable processes.

4.4 Method—Processing the Set of Regions to Detect a Set of Objects S400

The method 200 can include processing the set of regions to detect a set of objects S400, which functions to characterize the user's environment and provide actionable information accordingly.

S400 is preferably performed with an object detection and/or classification algorithm, wherein the object detection algorithm is preferably a trained model (e.g., deep learning model) and further preferably a neural network (e.g., convolutional neural network [CNN], but can additionally or alternatively include any suitable computer vision process, algorithm, model, and/or tool.

The set of objects detected preferably includes at least vehicles having 4 or more wheels (e.g., cars, buses, trucks, etc.), but can additionally or alternatively include other vehicles (e.g., bikes, mopeds, motorcycles, scooters, etc.), pedestrians, static objects, and/or any other objects.

Each of the set of regions is preferably processed individually (e.g., in series with each other, in parallel with each other, etc.). Additionally or alternatively, any or all of the regions can be processed together.

The outputs of the object detection and/or objects classification algorithm preferably includes a set of detected objects (e.g., represented as bounding boxes, 3D meshes, identifiers, object types, classified objects, etc.) and optionally any number of features associated with the objects (e.g., classification/type, size, location, speed, etc.). Additionally or alternatively, any other outputs can be produced.

The detected objects can optionally be stabilized in S300 (e.g., as described above), which functions to stabilize the objects based on motion and/or orientation data (e.g., IMU data, gyroscope data, accelerometer data, etc.). Additionally or alternatively, the detected objects can be de-warped, otherwise processed, not processed, and/or any combination.

S400 can optionally further include any other processes, such as processing the detected objects with any or all of: a depth estimation process, a tracking process, a prediction process (e.g., to determine if an object is predicted to collide with the rider, to determine if an object is heading toward the rider, to determine if an object is within a predetermined distance of the rider, etc.), and/or any other processes. In some variations, for instance, an output of S400 is a set of 3D trajectories associated with each of the set of detected objects over time).

Additionally or alternatively, S400 can include any other processes.

4.5 Triggering an Action Based on the Set of Objects S500

The method 200 can optionally include triggering an action based on the set of objects S500, which functions to provide actionable information to the rider (and/or other users) based on the environmental understanding produced in the prior processes of the method 200.

S500 is preferably performed in response to detecting that the rider is potentially in danger with respect to trajectories and/or predicted trajectories of the detected objects, but can additionally or alternatively be performed in response to a particular scenario, and/or otherwise performed.

Figure 7:
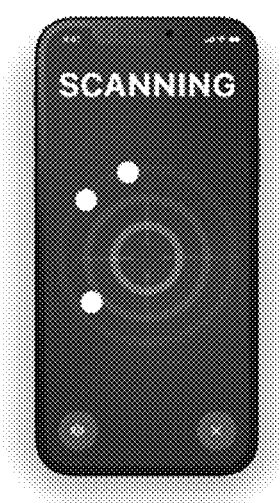
FIG. 7 depicts an example of a set of possible actions triggered in response to the method for providing a rider with a dynamic environmental awareness.
Figure 7:
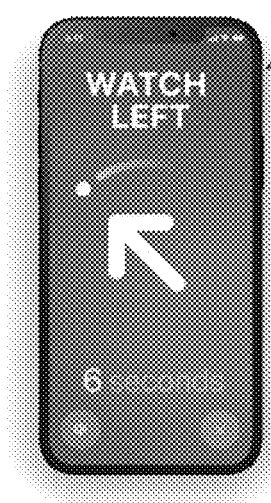
Figure 7:
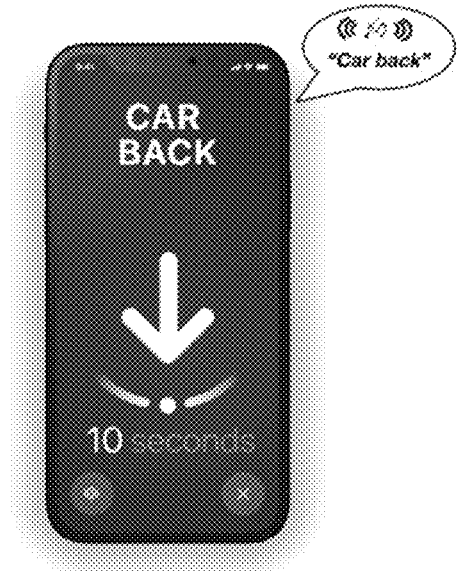
Figure 7:
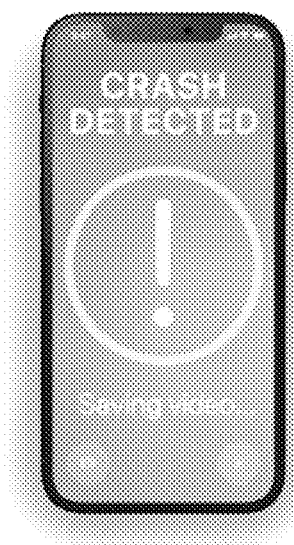

The actions preferably include notifications and/or alerts provided at a user device and/or one or more output devices of the system, such as any or all of: an audio alert (e.g., of a particular sound and/or volume based on the type and/or location of the danger) produced at one or more speakers (e.g., of the user device, of supplementary speakers coupled to the vehicle and/or camera), a visual alert (e.g., display at a screen of the user device), and/or any other alerts. The alerts can optionally convey a directionality associated with the danger and relative to the rider (e.g., direction from which a dangerous object is coming), such as through any or all of: a visual direction provided to the user (e.g., as shown in FIG. 7), a location at which the audio output is provided (e.g., the location of the speaker which is played relative to other speakers, with a beamforming process, etc.), and/or with any other components and/or processes.

Additionally or alternatively (e.g., as shown in FIGS. 8A-8B), the alert can indicate, at a display of the user, the particular object (e.g., cyclist, car, etc.) that is causing the alert. In some variants, for instance, a bounding box visual directly obtained from S400 (e.g., bounding box, bounding box in a particular color, bounding box filled in, etc.), is overlaid on the video stream being shown to the user, which effectively outlines the object that is a risk to the operator.

Additionally or alternatively, any other suitable visuals can be provided (e.g., highlighting the object, etc.), such as an indication of which direction (e.g., in front of rider, behind rider, etc.) the object is approaching from, which direction the operator should look, and/or any other information.

In specific examples, an audio alert (e.g., noise, beep, etc.) is provided in combination with a visual indication.

The actions can additionally or alternatively include an automatic recording and/or transmission of sensor data, such as an automatic recording of video data at the time at which a danger is detected (e.g., until the danger subsides, until a predetermined time has passed, etc.) and/or a collision occurs. This can function, for instance, to provide the rider with evidence of a dangerous scenario (e.g., to report a potential incident, to report an actual incident, etc.).

Additionally or alternatively, the actions can include notifying other users (e.g., emergency services, nearby riders, etc.) and/or any other actions.

The method 200 can additionally or alternatively include any other suitable processes.

Although omitted for conciseness, the preferred embodiments include every combination and permutation of the various system components and the various method processes, wherein the method processes can be performed in any suitable order, sequentially or concurrently.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

Additional or alternative embodiments implement the above methods and/or processing modules in non-public transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-public transitory computer readable media, or any suitable device. The computer-executable component can include a computing system and/or processing system (e.g., including one or more collocated or distributed, remote or local processors) connected to the non-public transitory computer-readable medium, such as CPU, GPUs, TPUS, microprocessors, or ASICs, but the instructions can alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

I claim:

1. A method for generating and providing alerts to an operator of a vehicle, the method comprising:
    sampling a set of images from a set of cameras coupled to the vehicle;
    for each of the set of images:
        identifying a set of regions that collectively cover a portion of the image and are at least partially overlapping relative to each other, wherein the set of regions comprises multiple sizes of regions and multiple locations of regions within the image;
        down-sampling at least a portion of the set of regions to produce regions of varying image resolution;
        identifying a set of objects based on the set of regions by processing each of the set of regions with a set of trained models to produce a set of bounding boxes;
        stabilizing the identified set of objects to produce a stabilized set of objects; and
        during the trip, providing an alert to the operator based on at least one of the stabilized sets of objects.

2. The method of claim 1, further comprising updating the set of trained models based on the alert, and using the updated set of trained models to provide a $2^{nd}$ alert based on a $2^{nd}$ set of images collected during a $2^{nd}$ trip.

3. The method of claim 1, wherein providing the alert comprises displaying an associated image of the set of images and a bounding box produced from the associated image to the operator at a display.

4. The method of claim 3, wherein the display is onboard a user device of the operator.

5. The method of claim 1, wherein the set of cameras comprises multiple cameras, wherein the alert is determined at least in part based on which of the set of cameras is associated with detection of the at least one of the stabilized sets of objects.

6. The method of claim 1, wherein providing the alert further comprises identifying at least one of a location or a motion of the object relative to an assumed position of the vehicle.

7. The method of claim 1, wherein the multiple locations of sub-regions within the image are determined at least in part relative to a vanishing point depicted in the image.

8. The method of claim 1, further comprising pre-processing the set of images, wherein the set of regions are identified in the pre-processed images.

9. The method of claim 8, wherein pre-processing the set of images comprises at least one of: correcting for roll in the set of images or de-warping the set of images.

10. The method of claim 1, wherein a shape associated with the set of regions comprises at least one of a square or a rectangle.

11. The method of claim 10, wherein the set of regions comprise multiple different shape types.

12. The method of claim 1, wherein a $1^{st}$ portion of the set of regions is predetermined and a $2^{nd}$ portion of the set of regions is dynamically determined.

13. The method of claim 12, wherein the $2^{nd}$ portion of the set of images is determined based on a previously sampled image in the set of images.

14. The method of claim 12, further comprising collecting supplementary sensor data from an inertial measurement unit coupled to the vehicle, wherein the $2^{nd}$ portion of the set of regions is determined at least in part based on the supplementary sensor data.

15. A system for generating and providing alerts to a user, the system comprising:
    a set of multiple cameras coupled to a vehicle, each of the set of multiple cameras configured to sample a set of images during a trip of the vehicle;
    a processing subsystem coupled to the vehicle, the processing subsystem configured to, for each sampled image:
        identify a set of regions that collectively cover a portion of the image and are at least partially overlapping relative to each other, wherein the set of regions comprises multiple sizes of regions and multiple locations of regions within the image;
        down-sampling at least a portion of the set of regions to produce regions of varying image resolution;
        identify a set of objects based on the set of regions by processing each of the set of regions with a set of trained models to produce a set of bounding boxes;
        stabilize the identified set of objects to produce a stabilized set of objects; and
        at a display, provide an alert to the operator based on the stabilized set of objects.

16. The system of claim 15, wherein each of the set of multiple cameras is a monocular camera, wherein the set of multiple cameras comprises a $1^{st}$ camera configured to capture a forward view of the vehicle, and a $2^{nd}$ camera configured to capture a rear view of the vehicle.

17. The system of claim 15, wherein the user is an operator of the vehicle, wherein the vehicle is one of a bicycle, a moped, or a motorcycle.

18. The system of claim 15, further comprising a set of supplementary sensors configured to collect supplementary data, the supplementary data comprising motion and orientation data, wherein at least a portion of the set of regions in a sampled image is determined based on at least one of: the supplementary data or a previously collected set of images collected during the trip.

\* \* \* \* \*